United States Patent
Sakumoto et al.

(10) Patent No.: US 8,829,153 B2
(45) Date of Patent: Sep. 9, 2014

(54) POLYIMIDE PRECURSOR COMPOSITION CONTAINING POLYAMIC ACID ALKYL ESTER

(75) Inventors: Naoki Sakumoto, Funabashi (JP); Masato Nagao, Funabashi (JP); Yuho Noguchi, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 338 days.

(21) Appl. No.: 13/262,472

(22) PCT Filed: Apr. 1, 2010

(86) PCT No.: PCT/JP2010/056031
§ 371 (c)(1),
(2), (4) Date: Dec. 19, 2011

(87) PCT Pub. No.: WO2010/114103
PCT Pub. Date: Oct. 7, 2010

(65) Prior Publication Data
US 2012/0101236 A1    Apr. 26, 2012

(30) Foreign Application Priority Data

Apr. 2, 2009 (JP) ................................. 2009-089871

(51) Int. Cl.
| | |
|---|---|
| C08G 73/10 | (2006.01) |
| C08K 5/00 | (2006.01) |
| C08L 79/08 | (2006.01) |
| C08K 5/31 | (2006.01) |
| C08K 5/54 | (2006.01) |
| C08K 5/29 | (2006.01) |
| C08K 5/3445 | (2006.01) |

(52) U.S. Cl.
CPC . *C08G 73/10* (2013.01); *C08K 5/31* (2013.01); *C08K 5/0025* (2013.01); *C08K 5/54* (2013.01); *C08L 79/08* (2013.01); *C08K 5/29* (2013.01); *C08K 5/3445* (2013.01)
USPC ........ 528/353; 428/458; 428/473.5; 525/431; 525/432; 528/310

(58) Field of Classification Search
CPC .... C08L 79/08; C08G 73/10; C08G 73/1085; H05K 1/0346; H05K 2201/0154; H05K 1/0271; H05K 1/0393; H05K 2201/068; H05K 2201/09827; H05K 2203/1545; H05K 3/002; C08J 2379/08; C08J 5/18; C09D 179/08
USPC ........ 428/458, 473.5; 525/431, 432; 528/310, 528/353
See application file for complete search history.

(56) References Cited

U.S. PATENT DOCUMENTS

2009/0123867 A1 * 5/2009 Yuba et al. ................. 430/270.1

FOREIGN PATENT DOCUMENTS

| JP | 59-223727 | 12/1984 |
|---|---|---|
| JP | 60-15426 | 1/1985 |
| JP | 60-15427 | 1/1985 |
| JP | 5-247209 | 9/1993 |
| JP | 7-278298 | 10/1995 |
| JP | 9-12719 | 1/1997 |
| JP | 9-302225 | 11/1997 |
| JP | 2003-292618 | 10/2003 |
| JP | 2006-16592 | 1/2006 |
| JP | 2007-56196 | 3/2007 |
| JP | 2007-291405 | 11/2007 |
| WO | WO 2010/050523 A1 | 5/2010 |

OTHER PUBLICATIONS

USPTO structure search, Oct. 2013.*
International Search Report issued Jun. 15, 2010 in PCT/JP2010/056031.
W. Volksen, et al., "Base-Catalyzed Cyclization of Ortho-Aromatic Amide-Alkyl Esters: A Novel Approach to Chemical Imidization", Proc. Am. Chem. Soc. Polym. Mater. Sci. Eng., vol. 66, 1992, pp. 235-236.

* cited by examiner

*Primary Examiner* — Gregory Listvoyb
(74) *Attorney, Agent, or Firm* — Oblon, Spivak, McClelland, Maier & Neustadt, L.L.P.

(57) ABSTRACT

To provide a polyamic acid ester-containing polyimide precursor composition having a good storage stability, from which a polyimide film having a high imidization degree and excellent adhesion to an inorganic substrate can be obtained. A polyimide precursor composition comprising a polyamic acid ester, a thermal imidization accelerator and a solvent, wherein the thermal imidization accelerator is a compound which has a carboxy group and an amino group or an imino group which is deprotected by heat to show basicity, and which will not accelerate the imidization of the polyamic acid ester before the protecting group leaves, and a polyimide precursor composition containing a silane coupling agent.

20 Claims, No Drawings

POLYIMIDE PRECURSOR COMPOSITION CONTAINING POLYAMIC ACID ALKYL ESTER

CROSS-REFERENCE TO RELATED APPLICATIONS

This application is a National Stage of PCT/JP2010/056031 filed on Apr. 1, 2010. This application is based upon and claims the benefit of priority to Japanese Application No. 2009-089871 filed on Apr. 2, 2009, the entire contents of which are incorporated herein by reference.

BACKGROUND OF THE INVENTION

1. Technical Field

The present invention relates to a polyimide precursor composition containing a polyamic acid alkyl ester, and a polyimide film having a high imidization degree obtainable from the polyimide precursor composition.

2. Background Art

A polyimide is a polymer material excellent in the heat resistance, the mechanical strength, the electrical properties and the solvent resistance and is widely used e.g. in an electronic material field as a polyimide film such as an insulating film, a protective film or a liquid crystal alignment film. To industrially obtain such a polyimide film, a common method is to prepare a coating liquid having a polyimide or a polyimide precursor dissolved in a solvent, apply and bake it.

As the polyimide precursor, a polyamic acid, a polyamic acid ester, etc. are used. They are advantageous in that they are highly soluble in a solvent as compared with a polyimide, and accordingly, in the case of the above method of using a coating liquid to obtain a polyimide film, the structure of the polyimide, the type of the solvent to be used, etc. can relatively freely be selected. The coating film of such a polyimide precursor is imidized by being baked at from 200 to 400° C. to form a polyimide film.

A polyamic acid is easily obtained by reacting a diamine with a tetracarboxylic dianhydride, and as this reaction is a reversible reaction, a reverse reaction to the diamine and the acid dianhydride also proceeds at the same time as the imidization by the heat at the time of baking. As a result, the molecular weight of the polyimide to be obtained is lower than the starting polyamic acid, and such may impair the properties of the polyimide film. On the other hand, with the polyamic acid ester, no reverse reaction such as that of the polyamic acid occurs, and thus there will be no decrease in the molecular weight at the time of baking, however, imidization is less likely to proceed by heat as compared with the polyamic acid, and imidization at a temperature higher than that for the polyamic acid will be required.

In general, the higher the above baking temperature, the higher the imidization degree from the polyimide precursor to the polyimide. Although it is not necessarily required to achieve an imidization degree of a polyimide film of 100% depending upon the purpose of use, achievement of a desired imidization degree at a lower temperature is advantageous in view of the energy cost and is advantageous in that a polyimide film can be formed also on a substrate having low heat resistance.

To solve such problems, heretofore, a method of mixing various compounds having an imidization accelerating effect with a polyimide precursor composition at the time of imidization by heating has been proposed. For example, as a compound which can imidize a polyamic acid by baking at a low temperature, an amino acid compound has been disclosed (Patent Document 1). Further, as a compound to lower the imidization temperature of a polyamic acid alkyl ester to the vicinity of 150° C., an amine compound such as phenetylamine or dodecylamine has been disclosed (Non-Patent Document 1).

Further, it is disclosed that a thermal base generator which is a neutral compound which is decomposed by heat to generate a secondary amine does not form a salt with the carboxy group in the polyamic acid when not heated, and accordingly the polyimide precursor composition has good storage stability, and accordingly the thermal base generator is useful as a thermal imidization accelerator for a polyamic acid (Patent Document 2). It is also disclosed that as this thermal base generator can be used also as a thermal imidization accelerator for a polyamic acid ester, it can be used regardless of the type of the polyimide precursor.

From the viewpoint different from the imidization degree, when a polyimide film is to be formed on a substrate made of an inorganic material, insufficiency in the adhesion to the substrate is problematic in some cases. In such a case, a method of using an organic silicon compound called a silane coupling agent is commonly employed. As a method of using the silane coupling agent, a method of coating the surface of a substrate with a silane coupling agent, followed by forming a polyimide film, a method of adding a silane coupling agent to a coating liquid for preparation of a polyimide film, a method of reacting a silane coupling agent with e.g. the terminal of the polyimide or the polyimide precursor, and the like have been known.

PRIOR ART DOCUMENTS

Patent Documents

Patent Document 1: JP-A-2007-291405
Patent Document 2: JP-A-2007-56196

Non-Patent Document

Non-Patent Document 1: W. Volken: Proc. Am. Chem. Soc. Polym. Mater. Sci. Eng., 1992, Vol. 66, p. 235-236

DISCLOSURE OF INVENTION

Technical Problem

As described above, various imidization accelerators to be used for a polyimide precursor have been reported. However, according to studies by the present inventors, many of compounds useful as a thermal imidization accelerator for a polyamic acid do not have sufficient effects as a thermal imidization accelerator for a polyamic acid ester. Further, an aliphatic amine compound such as phenetylamine or dodecylamine, which has a high imidization accelerating effect for a polyamic acid ester, readily accelerates imidization even at room temperature, and thus if it is preliminarily mixed in a coating liquid, precipitation of a polymer or gelation may occur during storage.

Further, if both silane coupling agent and imidization accelerator are added to a coating liquid for a polyamic acid ester, the effect of improving the adhesion by the silane coupling agent is weakened in some cases. Under these circumstances, it is an object of the present invention to provide a polyimide precursor composition from which a polyimide film having a higher imidization degree than that of a conventional technique can be obtained when a polyamic acid ester which is less likely to undergo thermal imidization is used as the polyimide precursor, which has good storage stability when formed into a coating liquid, and further, from which a polyimide film excellent in the adhesion to an inorganic substrate can be obtained.

Solution to Problem

The present inventors have conducted extensive studies to achieve the above object and as a result, found that a specific compound having a carboxy group and an amino group or an imide group to be deprotected by heat to show basicity, which satisfies the following requirements (a) to (d), is useful as a thermal imidization accelerator for a polyamic acid ester, and accomplished the present invention.

The present invention provides a polyimide precursor composition comprising the following components A and B and an organic solvent to dissolve theses components:

component A: a polyamic acid ester as a polyimide precursor;

component B: a compound which satisfies all the following requirements (a) to (d):
(a) it has at least one carboxy group;
(b) it has a partial structure represented by the following formula (N-1) or (N-2), at least one part in all the structures represented by the formula (N-1) is bonded to an aromatic ring or a carbonyl group or is a part of a guanidine framework, and the part of the nitrogen atom in all the structures represented by the formula (N-2) is bonded to a carbon atom constituting an unsaturated bond, provided that when the formula (N-1) is a part of a guanidine framework, at least one of the two (N-1) structures contained in the guanidine framework is bonded to an aromatic ring or a carbonyl group:

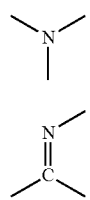

(N-1)

(N-2)

the above formulae (N-1) and (N-2) represent a trivalent structure in the compound;

(c) at least one of the partial structures represented by the formula (N-1) is a partial structure represented by the following formula (ND-1) not directly bonded to an aromatic ring or a carbonyl group, or at least one of the partial structures represented by the formula (N-2) is a partial structure represented by the following formula (ND-2):

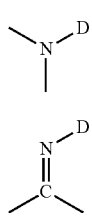

(ND-1)

(ND-2)

the formulae (ND-1) and (ND-2) represent a bivalent structure in the compound, and in the formula (ND-1) or (ND-2), D is a protecting group to be replaced by a hydrogen atom by heat; and (d) it has at least one structure represented by the formula (ND-1) or (ND-2) defined by the above requirement (c) per one carboxy group.

Advantageous Effects of Invention

According to the polyimide precursor composition of the present invention, a polyimide film having a high imidization degree as compared with a conventional technique can be obtained when a polyamic acid ester which is less likely to undergo imidization by heating is used as a polyimide precursor, and good storage stability is achieved. Further, the improvement in the adhesion by a silane coupling agent is not impaired, and a polyimide film having good adhesion to a substrate such as a glass substrate or a silicon nitride substrate can be obtained.

DESCRIPTION OF EMBODIMENTS

[Component A]

The polyamic acid ester as the component A to be used in the present invention is a polyimide precursor to obtain a polyimide and is a polymer having the following moiety capable of imidization.

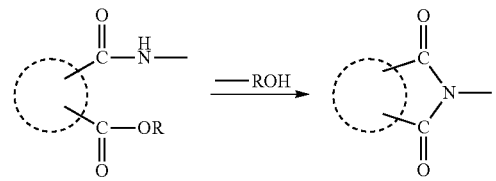

wherein R is a monovalent organic group.

The polyamic acid ester has, for example, repeating units represented by the following formula (1), and is converted to a polyimide having repeating units represented by the following formula (2) by the above imidization:

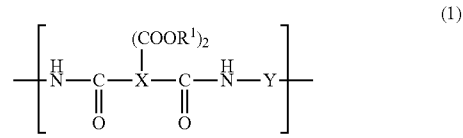

(1)

wherein $R^1$ is a $C_{1-4}$ alkyl group, X is a tetravalent organic group, and Y is a bivalent organic group;

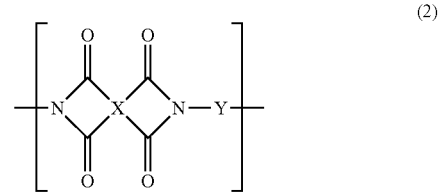

(2)

wherein X and Y are as defined in the formula (1).

In the formula (1), $R^1$ may, for example, be specifically a methyl group, an ethyl group, a propyl group, a 2-propyl group, a butyl group or a t-butyl group. In general, as the number of carbon atoms in the polyamic acid ester increases in the order of a methyl group, an ethyl group and a propyl group, the temperature at which imidization proceeds is higher. Accordingly, from the viewpoint of easiness of imidization by heat, a methyl group or an ethyl group is preferred, and a methyl group is particularly preferred.

In the formula (1), X is a tetravalent organic group, and is required to have a structure capable of imidization by the ester group and the amide moiety in the formula (1). An example of X may be a structure of X in a tetracarboxylic dianhydride represented by the following formula (3):

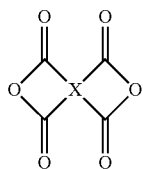

(3)

The tetracarboxylic dianhydride represented by the above formula (3) is reacted with a diamine represented by the following formula (4) to obtain a polyamic acid, and the polyamic acid is further subjected to cyclodehydration to obtain a polyimide:

(4)

Representative examples of X in the known tetracarboxylic dianhydride represented by the formula (3) are shown below, but the present invention is not limited thereto. Further, the polyamic acid ester represented by the formula (1) may be a copolymer comprising a plurality of structures differing in X:

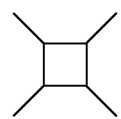
(X-1)

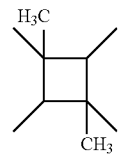
(X-2)

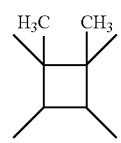
(X-3)

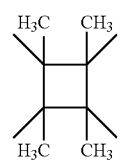
(X-4)

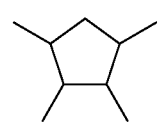
(X-5)

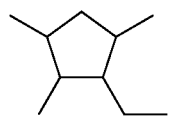
(X-6)

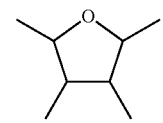
(X-7)

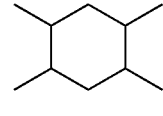
(X-8)

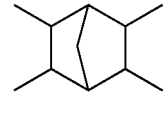
(X-9)

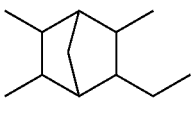
(X-10)

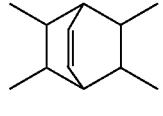
(X-11)

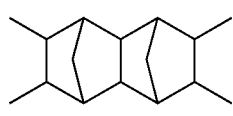
(X-12)

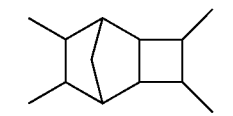
(X-13)

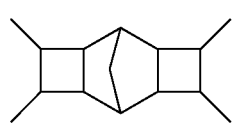
(X-14)

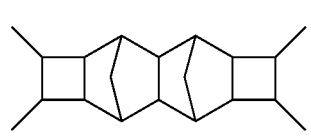
(X-15)

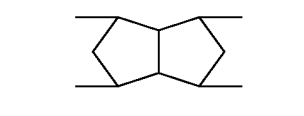
(X-16)

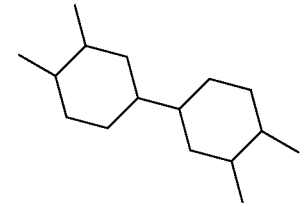
(X-17)

(X-18) 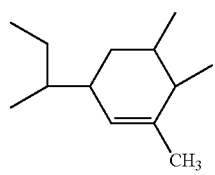
(X-19) 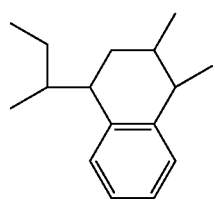
(X-20) 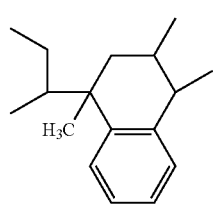
(X-21) 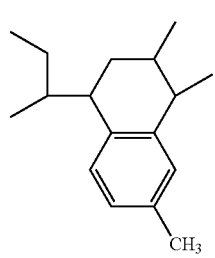
(X-22) 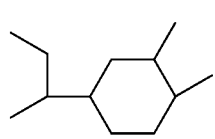
(X-23) 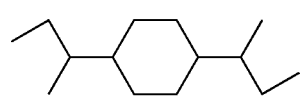
(X-24) 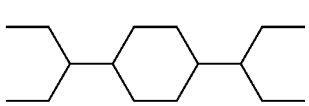
(X-25) 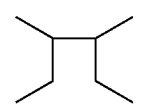
(X-26) 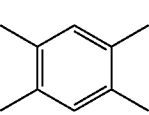
(X-27) 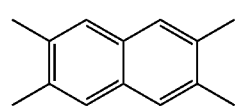
(X-28) 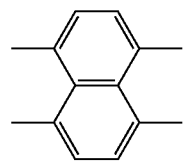
(X-29) 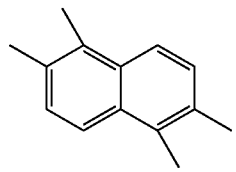
(X-30) 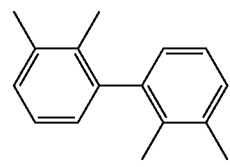
(X-31) 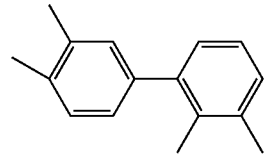
(X-32) 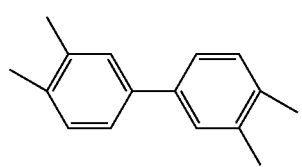
(X-33) 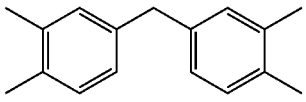
(X-34) 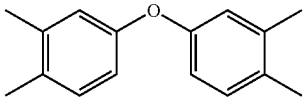
(X-35) 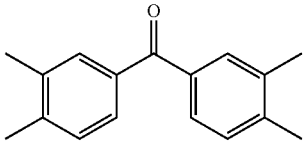
(X-36) 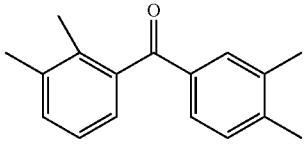
(X-37) 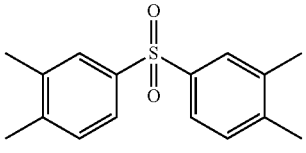

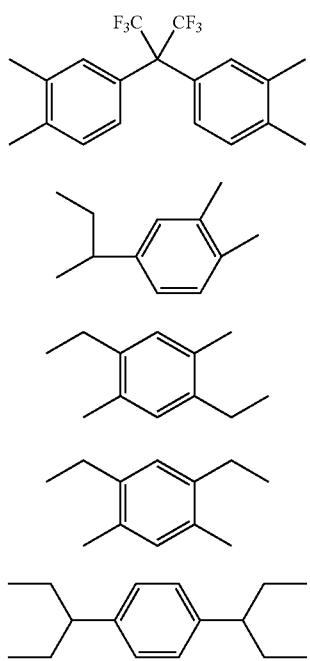

(X-38)

(X-39)

(X-40)

(X-41)

(X-42)

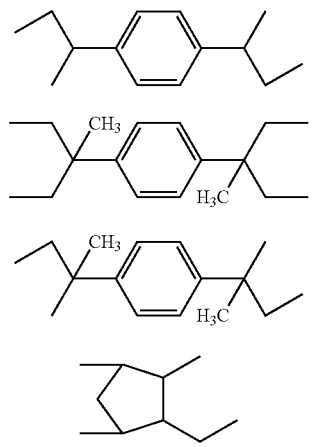

(X-43)

(X-44)

(X-45)

(X-46)

In the formula (1), Y is a bivalent organic group and is not particularly limited, and may, for example, be a structure of Y in the diamine represented by the above formula (4).

Representative examples of Y in the known diamine represented by the formula (4) are shown below, but the present invention is not limited thereto. Further, the polyamic acid ester represented by the formula (1) may be a copolymer comprising a plurality of structures differing in Y.

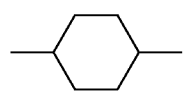
(Y-1)

(Y-2)

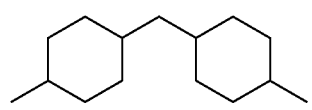
(Y-3)

(Y-4)

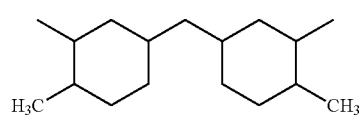
(Y-5)

(Y-6)

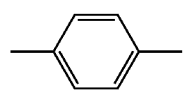
(Y-7)

(Y-8)

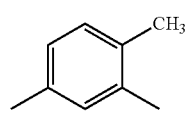
(Y-9)

(Y-10)

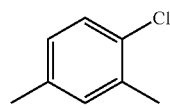
(Y-11)

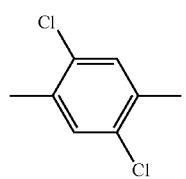
(Y-12)

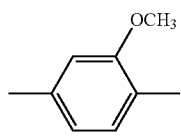 (Y-13)
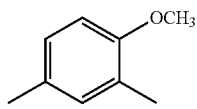 (Y-14)
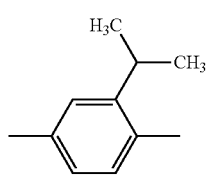 (Y-15)
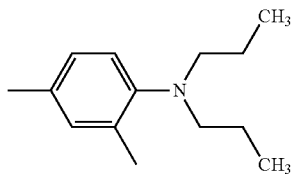 (Y-16)
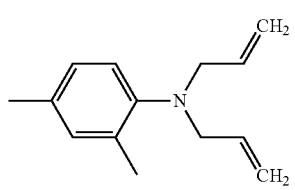 (Y-17)
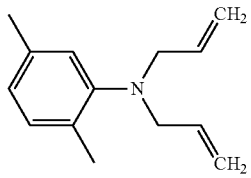 (Y-18)
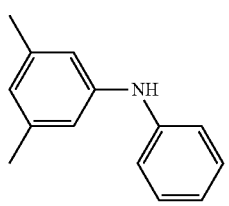 (Y-19)
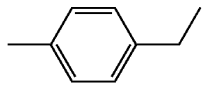 (Y-20)
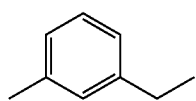 (Y-21)
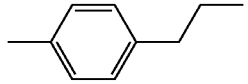 (Y-22)
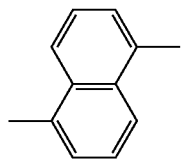 (Y-23)
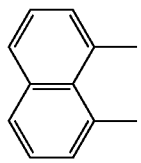 (Y-24)
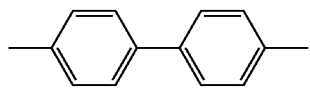 (Y-25)
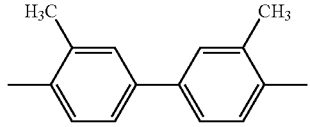 (Y-26)
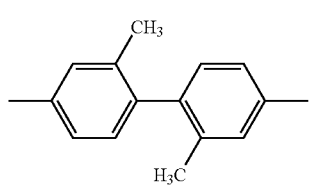 (Y-27)
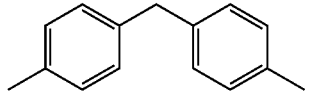 (Y-28)
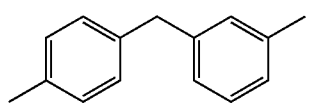 (Y-29)
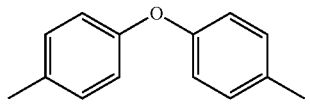 (Y-30)
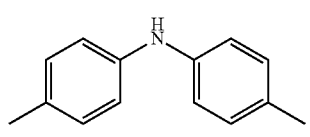 (Y-31)
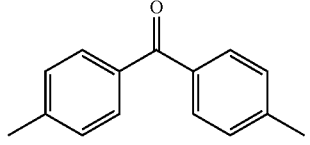 (Y-32)

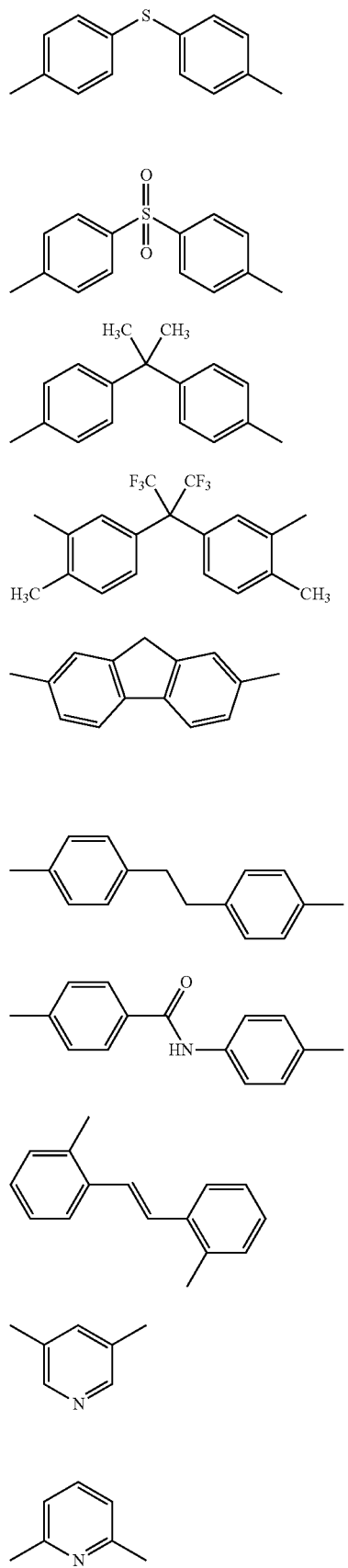

-continued
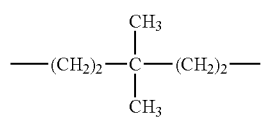 (Y-53)
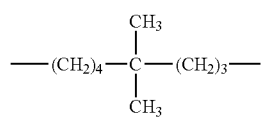 (Y-54)
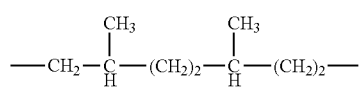 (Y-55)
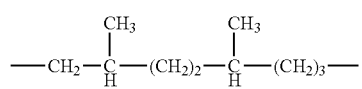 (Y-56)
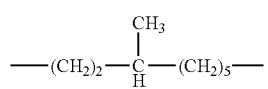 (Y-57)
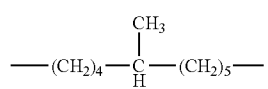 (Y-58)
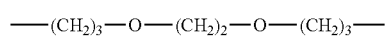 (Y-59)
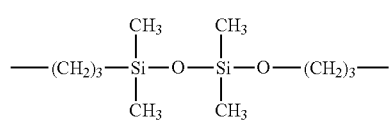 (Y-60)
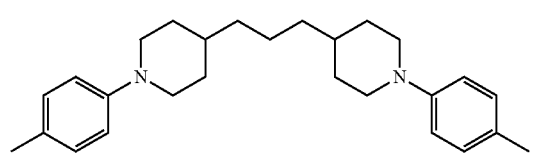 (Y-61)
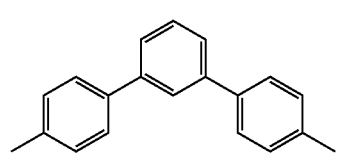 (Y-62)
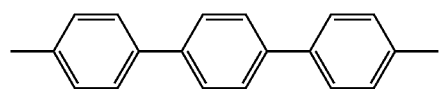 (Y-63)
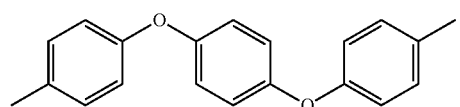 (Y-64)
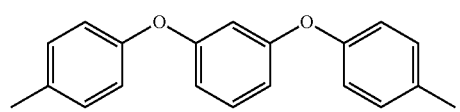 (Y-65)
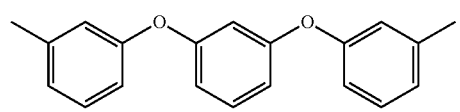 (Y-66)
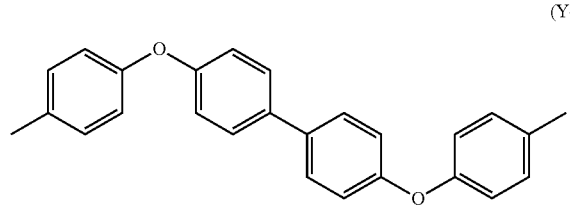 (Y-67)
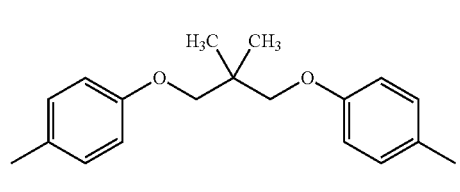 (Y-68)
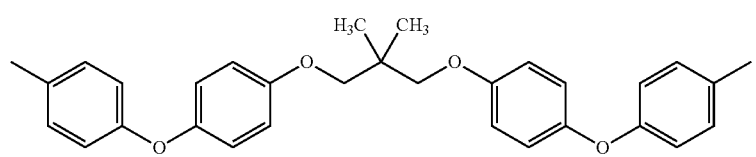 (Y-69)

-continued
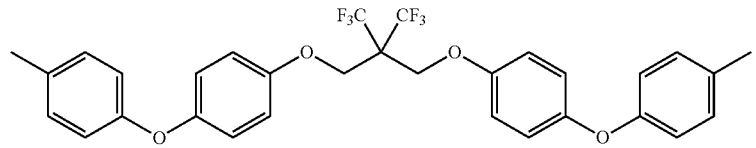 (Y-70)
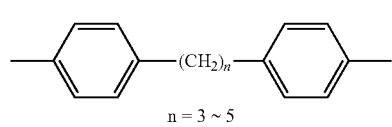 (Y-71)
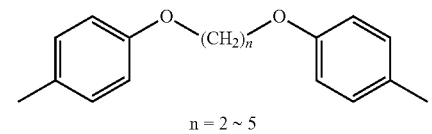 (Y-72)
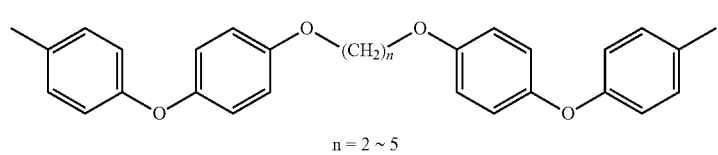 (Y-73)
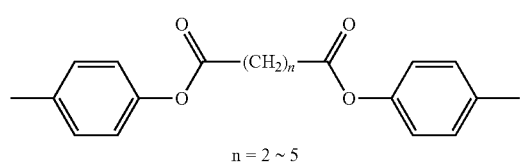 (Y-74)
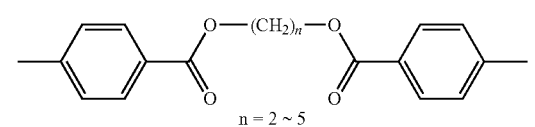 (Y-75)
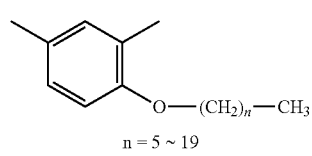 (Y-76)
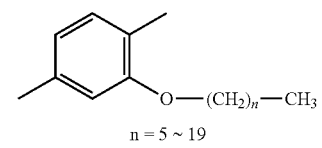 (Y-77)
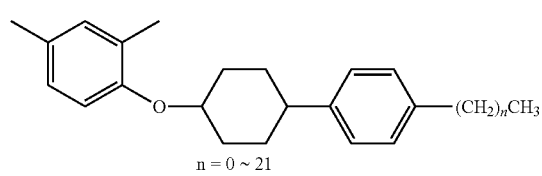 (Y-78)
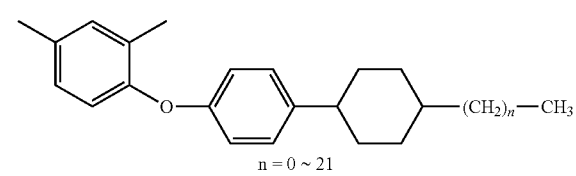 (Y-79)
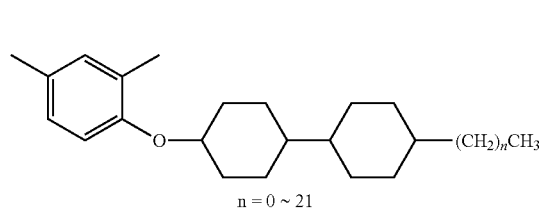 (Y-80)
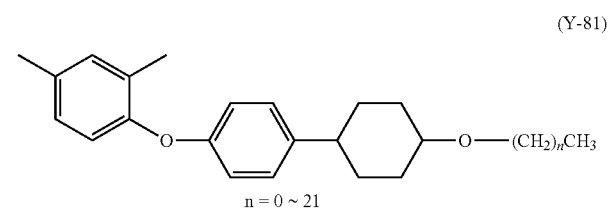 (Y-81)
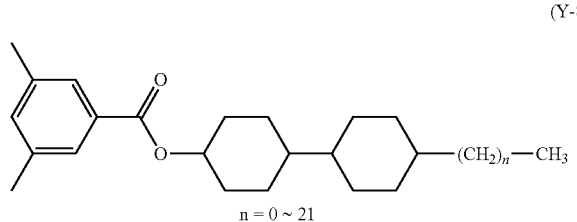 (Y-82)
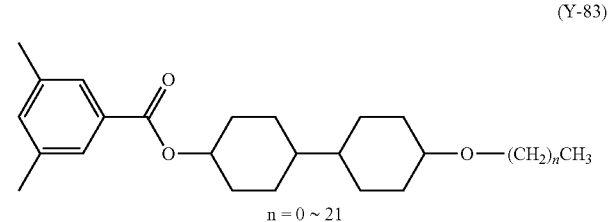 (Y-83)
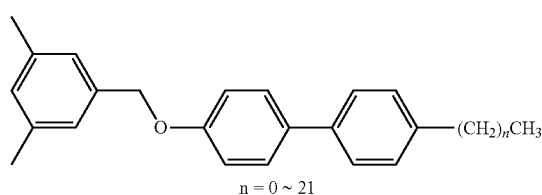 (Y-84)
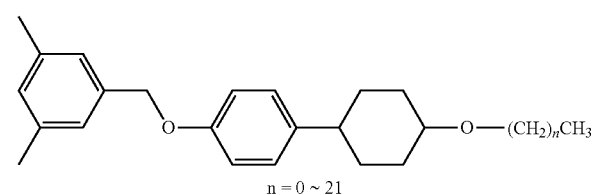 (Y-85)

-continued
(Y-86)
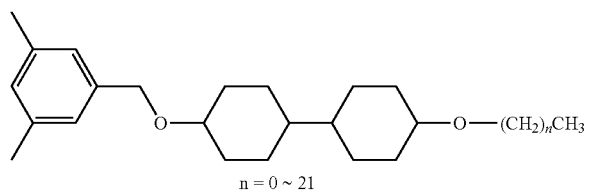
n = 0 ~ 21
(Y-87)
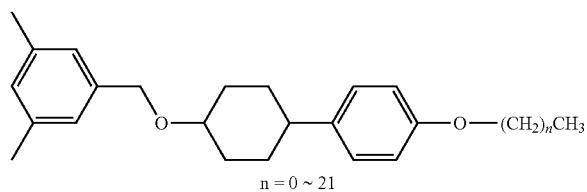
n = 0 ~ 21
(Y-88)
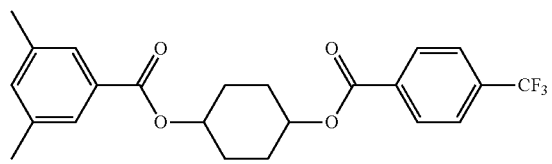
(Y-89)
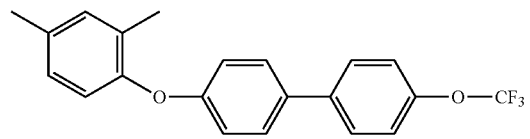
(Y-90)
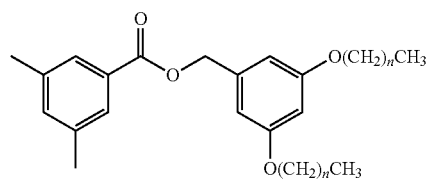
n = 0 ~ 21
(Y-91)
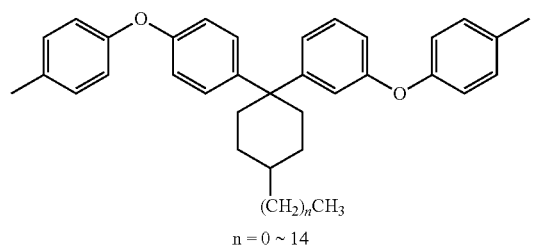
n = 0 ~ 14
(Y-92)
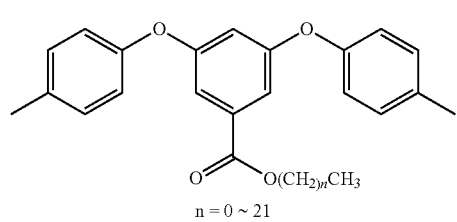
n = 0 ~ 21
(Y-93)
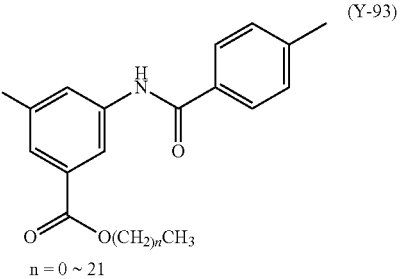
n = 0 ~ 21
(Y-94)
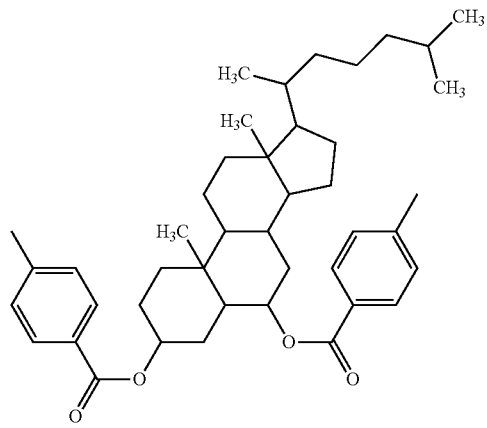
(Y-95)
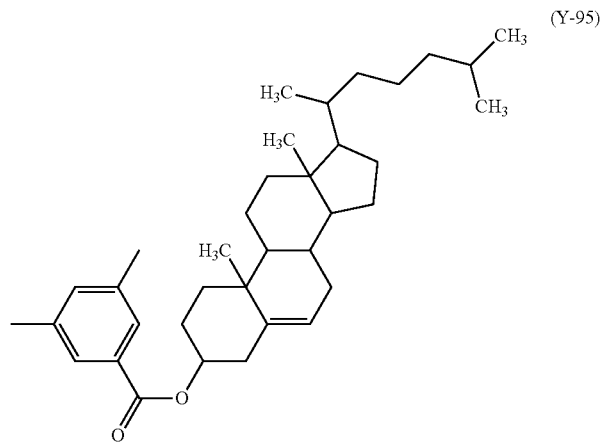

-continued (Y-96)

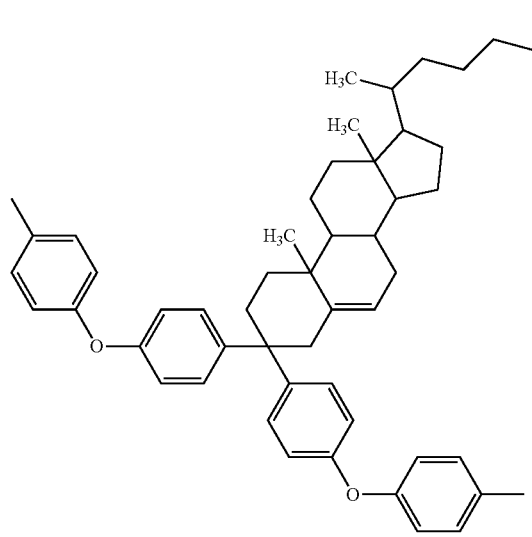

(Y-97)

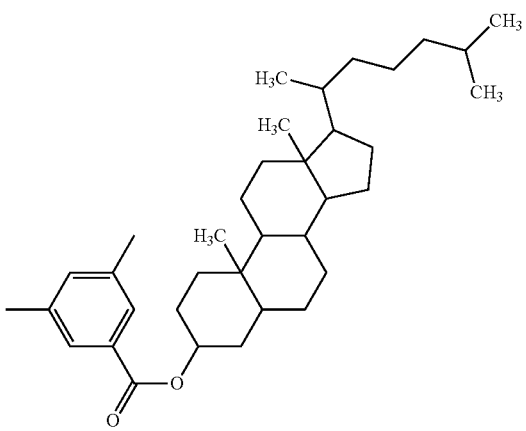

[Molecular Weight of Polyamic Acid Ester]

The molecular weight of the polyamic acid ester is influential over the viscosity of the polyimide precursor composition of the present invention and the physical strength of a polyimide film to be obtained from the composition. Further, the viscosity of the coating liquid is influential over the coating workability and the coating film uniformity.

Accordingly, from the viewpoint of good coating workability and coating film uniformity, the molecular weight of the polyamic acid ester is preferably at most 500,000 by the weight average molecular weight, more preferably at most 300,000, further preferably at most 100,000. On the other hand, with a view to imparting sufficient strength to a polyimide film to be obtained, the molecular weight is preferably at least 2,000 by the weight average molecular weight, more preferably at least 5,000, further preferably at least 10,000. The molecular weight of the polyamic acid ester is from 2,000 to 500,000 by the weight average molecular weight, more preferably from 5,000 to 300,000, further preferably from 10,000 to 100,000.

[Preparation of Polyamic Acid Ester]

The polyamic acid ester can be obtained, for example, by the following method (i) to (iii).

(i) Method of Preparing Polyamic Acid Ester from Polyamic Acid.

The polyamic acid ester can be prepared by reacting the tetracarboxylic dianhydride represented by the above formula (3) and the diamine represented by the above formula (4) in an organic solvent to obtain a polyamic acid, and esterifying the polyamic acid.

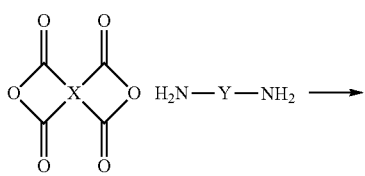

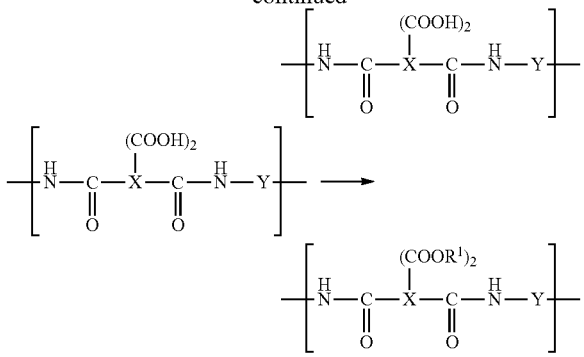

The organic solvent when the polyamic acid is prepared is preferably N,N-dimethylformamide, N-methyl-2-pyrolidone or γ-butyrolactone in view of the solubility of the monomer and the polymer, and they may be used alone or as a mixture of two or more. The concentration of the polymer at the time of the preparation reaction is preferably from 1 to 30 wt %, more preferably from 5 to 20 wt % in view of the processability of the reaction and the solubility of the polymer to be formed.

A specific example of the reaction of esterifying the polyamic acid may be a method of reacting the polyamic acid with an esterifying agent in the presence of an organic solvent at form $-20°$ C. to $150°$ C., preferably at from $0°$ C. to $50°$ C. for from 30 minutes to 24 hours, preferably for from 1 to 4 hours.

The esterifying agent is preferably one which can readily be removed by purification and may, for example, be N,N-dimethylformamide dimethyl acetal, N,N-dimethylformamide diethyl acetal, N,N-dimethylformamide dipropyl acetal, N,N-dimethylformamide dineopentylbutyl acetal, N,N-dimethylformamide di-t-butyl acetal, 1-methyl-3-p-tolyltriazene, 1-ethyl-3-p-tolyltriazene or 1-propyl-3-p-tolyltriazene. The amount of the esterifying agent is preferably from 2 to 6 molar equivalents per 1 mol of the repeating units of the polyamic acid.

The organic solvent at the time of the etherification may be the organic solvent for preparation of the polyamic acid.

(ii) Method of Preparing Polyamic Acid Ester from Acid Chloride and Diamine

The polyamic acid ester can be prepared by reacting a bis(chlorocarbonyl)dicarboxylic acid dialkyl ester (hereinafter sometimes referred to as an acid chloride) derived from the tetracarboxylic dianhydride represented by the above formula (3) and the diamine represented by the above formula (4) in an organic solvent:

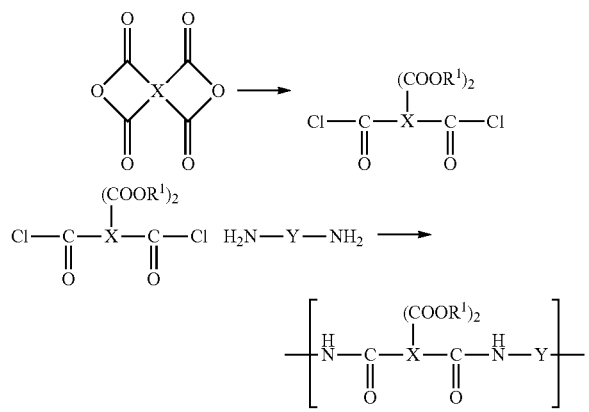

The above acid chloride can be obtained, for example, by reacting the tetracarboxylic dianhydride represented by the formula (3) with an alcohol represented by $R^1OH$ to form a tetracarboxylic acid dialkyl ester, and converting the carboxy group to a chlorocarbonyl group by a chlorinating agent.

A specific example of the reaction of the acid chloride with the diamine may be a method of reaction in the presence of a base and an organic solvent at from −20° C. to 150° C., preferably at from 0° C. to 50° C. for from 30 minutes to 24 hours, preferably from 1 to 4 hours.

The base to be used for the reaction may, for example, be pyridine, triethylamide or 4-dimethylaminopyridine, and among them, pyridine is preferred, whereby the reaction will moderately proceed. The amount of the base is appropriately from 2 to 4 times the molar quantity of the acid chloride considering the processability of the reaction and the efficiency for removal of the base when the obtained polyamic acid ester is purified.

The organic solvent to be used for the above reaction is preferably N-methyl-2-pyrolidone or γ-butyrolactone in view of the solubility of the monomer and the polymer, and they may be used alone or as a mixture of two or more. The concentration at the time of preparation reaction is preferably from 1 to 30 wt %, more preferably from 5 to 20 wt %, considering the processability of the reaction and the solubility of the polymer to be formed. Further, in order to prevent hydrolysis of the acid chloride, the organic solvent is preferably dehydrated as far as possible, and it is preferred to prevent inclusion of the air in a nitrogen atmosphere.

(iii) Method of Preparing Polyamic Acid Ester from Tetracarboxylic Acid Dialkyl Ester and Diamine The polyamic acid ester can be prepared by subjecting a tetracarboxylic acid dialkyl ester derived from the tetracarboxylic dianhydride represented by the above formula (3) and the diamine represented by the above formula (4) to dehydration condensation in an organic solvent:

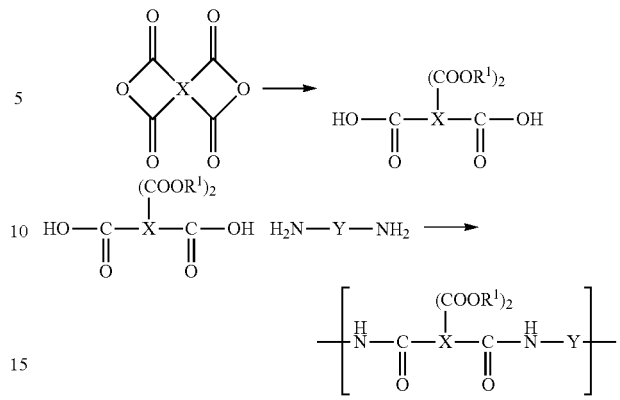

The above tetracarboxylic acid dialkyl ester can be obtained, for example, by reacting the tetracarboxylic dianhydride represented by the formula (3) with an alcohol represented by $R^1OH$.

A specific example of the dehydration condensation of the tetracarboxylic acid dialkyl ester and the diamine may be a method of reaction in the presence of a condensation agent, a base and an organic solvent at from 0° C. to 150° C., preferably at from 0° C. to 100° C. for from 30 minutes to 24 hours, preferably for from 3 to 15 hours.

The condensation agent to be used for the above reaction may, for example, be triphenyl phosphite, dicyclohexylcarbodiimide, 1-ethyl-3-(3-dimethylaminopropyl)carbodiimide hydrochloride, N,N'-carbonyldiimidazole, dimethoxy-1,3,5-triazinylmethylmorpholinium, O-(benzotriazol-1-yl)-N,N,N',N'-tetramethyluronium tetrafluoroborate, O-(benzotriazol-1-yl)-N,N,N',N'-tetramethyluronium hexafluorophosphate or diphenyl (2,3-dihydro-2-thioxo-3-benzoxazolyl)phosphonate. The amount of the condensation agent is appropriately from 2 to 3 times the molar quantity of the tetracarboxylic acid dialkyl ester considering the processability of the reaction and the efficiency for removal of the condensation agent when the obtained polyamic acid ester is purified.

The base to be used for the above reaction may be a tertiary amine such as pyridine or triethylamine. The amount of the base is appropriately from 2 to 4 times the molar quantity of the diamine considering the processability of the reaction and the efficiency for removal of the base when the obtained polyamic acid ester is purified.

Further, in the above reaction, the reaction will efficiently proceed by addition of a Lewis acid as an additive. The Lewis acid is preferably a lithium halide such as lithium chloride or lithium bromide. The amount of the Lewis acid is preferably from 0 to 1.0 time the molar quantity of the diamine.

The polyamic acid ester obtained by the above method (i) to (iii) is recovered by putting the reaction solution to a poor solvent with well stirring to precipitate it, followed by filtration. The poor solvent used may, for example, be water, methanol, ethanol, hexane, butyl cellosolve, acetone or toluene. By repeatedly carrying out the operation of dissolving the recovered polyamic acid ester in an organic solvent and putting the solution in a poor solvent to recover the polyamic acid ester, it can be purified. Further, the recovered polyamic acid ester may be washed with the above poor solvent and dried at room temperature or by heating under normal pressure or under reduced pressure to obtain its powder.

[Component B]

The component B to be used in the present invention is a compound to accelerate the thermal imidization of the above polyamic acid ester. The compound is required to satisfy all the above requirements (a) to (d).

That is, the component B in the present invention is a compound having a carboxy group (requirement (a)), and showing acidity in an ordinary state since the amino group or the imino group is weakly basic (requirement (b)). Further, it is characterized in that from the heated component B, the protective group D leaves and is replaced by a hydrogen atom to form a strongly basic amino group or imino group (requirement (c)) to form a compound having both properties of being acidic and basic. Further, it is also characterized in that since the number of the amino group or the imino group having high basicity formed by heat is the same or larger than the number of the carboxy group (requirement (d)), the component B after the protective group D leaves is from weakly acidic to basic as a whole.

By the above characteristics, the component B of the present invention will not accelerate imidization of the polyamic acid ester unless the protective group D leaves. Accordingly, the polyimide precursor composition will not undergo imidization during storage and has good storage stability.

Further, the imidization of the polyamic acid ester proceeds by the nucleophilic reaction from the nitrogen atom in the amide group to the carbonyl carbon in the ester group and subsequent desorption of an alcohol. Accordingly, in an imidization reaction of the polyamic acid ester, it is considered that the nucleophilicity of the nitrogen atom in the amido group and the electrophilicity of the carbonyl carbon in the ester group greatly influence the reactivity in the imidization. With respect to the component B of the present invention, the carboxy group can improve the electrophilicity of the carbonyl carbon and the amino group or the imino group formed by deprotection can improve the nucleophilicity of the nitrogen atom. Accordingly, the component B of the present invention has a high effect of accelerating the thermal imidization of the polyamic acid ester which is less likely to undergo thermal imidization.

The component B of the present invention must have at least one carboxy group, and preferably has from 1 to 4 carboxy groups in view of the handling efficiency of the compound. On the other hand, the number of the structure represented by (ND-1) or (ND-2) defined by the above requirement (c) should be at least 1 per one carboxy group, and is preferably from 1 to 8 in view of the handling efficiency.

D in the structure represented by (ND-1) or (ND-2) defined by the above requirement (c) is a protecting group of an amino group or an imino group to be deprotected by heat. That is, the moieties of —ND-, —NHD and =ND contained in the component B of the present invention are meant to be converted to —NH—, —NH2 and =NH by heating, respectively. In a case where there are a plurality of D's, their structures may be different from one another.

From the viewpoint of the storage stability of the polyamic acid composition of the present invention, the protecting group D does not preferably leave at room temperature, and it is more preferably a protecting group which leaves by heat of at least 80° C., further preferably a protecting group which leaves by heat of at least 100° C. Further, from the viewpoint of the efficiency for acceleration of thermal imidization of the polyamic acid ester, it is preferably a protecting group which leaves by heat of at most 300° C., more preferably a protecting group which leaves by heat of at most 250° C., further preferably a protecting group which leaves by heat of at most 200° C.

Further, the amino group represented by (ND-1) is required to be such that its basicity is weakened by bonding of the aromatic group or the carbonyl group before the protecting group D leaves, and its basicity is strengthened after the protecting group D leaves. Accordingly, (ND-1) has a structure such that the protecting group D which leaves by heat has an aromatic ring or a carbonyl group which is bonded to the amino group and (ND-1) itself is not directly bonded to the aromatic ring or the carbonyl group. In the same manner, (ND-2) has such a structure that the protecting group D which leaves by heat has a carbon atom constituting an unsaturated bond, bonded to the nitrogen atom in the imino group.

The structure of the above D is preferably an ester group represented by the following formula (5):

wherein $R^2$ is a $C_{1-22}$ hydrocarbon.

The ester group represented by the above formula (5) may, for example, be specifically a methoxycarbonyl group, a trifluoromethoxycarbonyl group, an ethoxycarbonyl group, a n-propoxycarbonyl group, an isopropoxycarbonyl group, a n-butoxycarbonyl group, a tert-butoxycarbonyl group, a sec-butoxycarbonyl group, a n-pentyloxycarbonyl group, a n-hexyloxycarbonyl group or a 9-fluorenylmethoxycarbonyl group. Among them, a tert-butoxycarbonyl group or a 9-fluorenylmethoxycarbonyl group is particularly preferred, which leaves at an appropriate temperature.

The component B of the present invention is more specifically such that the structure represented by the above (ND-1) or (ND-2) can be expressed as a monovalent group contained in the compound.

As preferred specific examples of the group having the structure represented by (ND-1) or (ND-2) may be groups represented by any of the following formulae (G-1) to (G-7). The compound as the component B preferably has at least one group represented by any of (G-1) to (G-7) per one carboxy group.

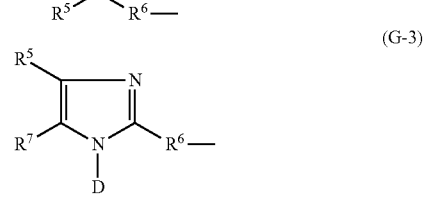

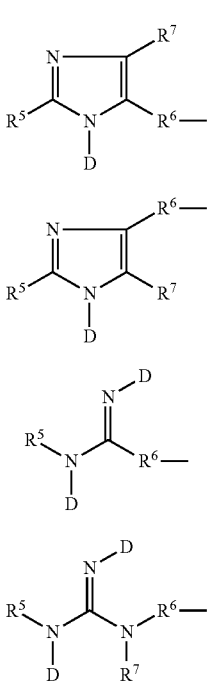

In the above formulae (G-1) to (G-7), D is a protecting group to be replaced by a hydrogen atom by heat, and in a case where there are a plurality of D's, their structures may be different from one another.

In the formula (G-1), $R^3$ is a hydrogen atom or a $C_{1-30}$ organic group, and the organic group is an alkyl group which may have a substituent. Further, $R^4$ is a single bond or a $C_{1-30}$ organic group, and the organic group is selected from an alkylene group, an alkenylene group, an alkynylene group and a group having these groups combined, which may have a substituent, provided that when $R^4$ is a single bond, (G-1) is not directly bonded to an aromatic group or a carbonyl group.

In the formulae (G-2) to (G-7), each of $R^5$ and $R^7$ is a hydrogen atom or a $C_{1-30}$ organic group, and the organic group is selected from an alkyl group, an alkenyl group, an alkynyl group and an aryl group, which may have a substituent. Further, $R^6$ is a single bond or a $C_{1-30}$ organic group, and the organic group is selected from an alkylene group, an alkenylene group, an alkynylene group, an arylene group and a group having these groups combined, which may have a substituent.

In the formulae (G-1) to (G-7), $R^3$ to $R^7$ may be mutually bonded to form a monocyclic ring or a polycyclic ring.

The above alkyl group may, for example, be specifically a methyl group, an ethyl group, a propyl group, a butyl group, a t-butyl group, a hexyl group, an octyl group, a decyl group, a cyclopentyl group, a cyclohexyl group or a bicyclohexyl group. The alkenyl group may be one having at least one CH—CH structure in the above alkyl group replaced by a C═C structure, and more specifically, it may, for example, be a vinyl group, an allyl group, a 1-propenyl group, an isopropenyl group, a 2-butenyl group, a 1,3-butadienyl group, a 2-pentenyl group, a 2-hexenyl group, a cyclopropenyl group, a cyclopentenyl group or a cyclohexenyl group. The alkynyl group may be one having at least one $CH_2$—$CH_2$ structure in the above alkyl group replaced by a C≡C structure, and more specifically, it may, for example, be an ethynyl group, a 1-propynyl group or a 2-propynyl group. The aryl group may, for example, be a phenyl group, an α-naphthyl group, a β-naphthyl group, an o-biphenylyl group, a m-biphenylyl group, a p-biphenylyl group, a 1-anthryl group, a 2-anthryl group, a 9-anthryl group, a 1-phenanthryl group, a 2-phenanthryl group, a 3-phenanthryl group, a 4-phenanthryl group or a 9-phenanthryl group.

The alkylene group may be one having one hydrogen atom removed from the alkyl group. More specifically, it may, for example, be a methylene group, a M-ethylene group, a 1,2-ethylene group, a 1,2-propylene group, a 1,3-propylene group, a 1,4-butylene group, a 1,2-butylene group, a 1,2-pentylene group, a 1,2-hexylene group, a 1,2-nonylene group, a 1,2-dodecylene group, a 2,3-butylene group, a 2,4-pentylene group, a 1,2-cyclopropylene group, a 1,2-cyclobutylene group, a 1,3-cyclobutylene group, a 1,2-cyclopentylene group, a 1,2-cyclohexylene group, a 1,2-cyclononylene group or a 1,2-cyclododecylene group. The alkenylene group may be a structure having one hydrogen atom removed from the alkenyl group. More specifically, it may, for example, be a 1,1-ethenylene group, a 1,2-ethenylene group, a 1,2-ethenylene methylene group, a 1-methyl-1,2-ethenylene group, a 1,2-ethenylene-1,1-ethylene group, a 1,2-ethenylene-1,2-ethylene group, a 1,2-ethenylene-1,2-propylene group, a 1,2-ethenylene-1,3-propylene group, a 1,2-ethenylene-1,4-butylene group, a 1,2-ethenylene-1,2-butylene group, a 1,2-ethenylene-1,2-heptylene group or a 1,2-ethenylene-1,2-decylene group. The alkynylene group may be a structure having one hydrogen atom removed from the alkynyl group. More specifically, it may, for example, be an ethynylene group, an ethynylene methylene group, an ethynylene-1,1-ethylene group, an ethynylene-1,2-ethylene group, an ethynylene-1,2-propylene group, an ethynylene-1,3-propylene group, an ethynylene-1,4-butylene group, an ethynylene-1,2-butylene group, an ethynylene-1,2-heptylene group or an ethynylene-1,2-decylene group. The arylene group may be a structure having one hydrogen atom removed from the aryl group. More specifically, it may, for example, be a 1,2-phenylene group, a 1,3-phenylene group, a 1,4-phenylene group, a 1,2-naphthylene group, a 1,4-naphthylene group, a 1,5-naphthylene group, a 2,3-naphthylene group, a 2,6-naphthylene group, a 3-phenyl-1,2-phenylene group or a 2,2'-diphenylene group.

Each of the above alkyl group, alkenyl group, alkynyl group and aryl group may have a substituent so long as the number of carbon atoms is from 1 to 20 as a whole, and may form a cyclic structure by the substituent. Further, each of the above alkylene group, alkenylene group, alkynylene group, arylene group and group having these groups combined may have a substituent so long as the number of carbon atoms is from 1 to 20 as a whole, and may form a cyclic structure by a substituent. Forming a cyclic structure by the substituent means that the substituents or the substituent and a part of the basic framework are bonded to form a cyclic structure.

Such a substituent may, for example, be a halogen atom, a hydroxy group, a thiol group, a nitro group, an organooxy group, an organothio group, an organosilyl group, an acyl group, an ester group, a thioester group, a phosphate group, an amide group, an aryl group, an alkyl group, an alkenyl group or an alkynyl group.

The halogen atom as the substituent may be a fluorine atom, a chlorine atom, a bromine atom or an iodine atom.

The organooxy group as the substituent may be a structure represented by —O—R such as an alkoxy group, an alkenyloxy group or an aryloxy group. R may, for example, be the above-described alkyl group, alkenyl group or aryl group. Such R may further be substituted by the above-described substituent. The alkyloxy group may, for example, be specifically a methoxy group, an ethoxy group, a propyloxy group, a butoxy group, a pentyloxy group, a hexyloxy group, a heptyloxy group, an octyloxy group, a nonyloxy group, a decyloxy group or a lauryloxy group.

The organothio group as the substituent may be a structure represented by —S—R such as an alkylthio group, an alkenylthio group or an arylthio group. Such R may, for example, be the above-described alkyl group, alkenyl group or aryl group. Such R may further be substituted by the above-described substituent. The alkylthio group may, for example, be specifically a methylthio group, an ethylthio group, a propylthio group, a butylthio group, a pentylthio group, a hexylthio group, a heptylthio group, an octylthio group, a nonylthio group, a decylthio group or a laurylthio group.

The oraganosilyl group as the substituent may be a structure represented by —Si—(R)$_3$. These R's may be the same or different, and may, for example, be the above-described alkyl group or aryl group. Such R may further be substituted by the above-described substituent. The alkylsilyl group may, for example, be specifically a trimethylsilyl group, a triethylsilyl group, a tripropylsilyl group, a tributylsilyl group, tripentylsilyl group, a trihexylsilyl group, a pentyldimethylsilyl group, a hexyldimethylsilyl group, an octyldimethylsilyl group or a decyldimethylsilyl group.

The acyl group as the substituent may be a structure represented by —C(O)—R. R may, for example, be the above-described alkyl group, alkenyl group or aryl group. Such R may further be substituted by the above-described substituent. The acyl group may, for example, be specifically a formyl group, an acetyl group, a propionyl group, a butyryl group, an isobutyryl group, a valeryl group, an isovaleryl group or a benzoyl group.

The ester group as the substituent may be a structure represented by —C(O)O—R or —OC(O)—R. R may, for example, be the above-described alkyl group, alkenyl group or aryl group. Such R may further be substituted by the above-described substituent.

The thioester group as the substituent may be a structure represented by —C(S)O—R or —OC(S)—R. R may, for example, be the above-described alkyl group, alkenyl group or aryl group. Such R may further be substituted by the above-described substituent.

The phosphate group as the substituent may be a structure represented by —OP(O)—(OR)$_2$. The R's may be the same or different and may, for example, be the above-described alkyl group or aryl group. Such R may further be substituted by the above-described substituent.

The amido group as the substituent may be a structure represented by —C(O)NH$_2$, —C(O)NHR, —NHC(O)R, —C(O)N(R)$_2$ or —NRC(O)R. The R's may be the same or different, and may, for example, be the above-described alkyl group or aryl group. Such R may further be substituted by the above-described substituent.

The aryl group as the substituent may be the same as the above-described aryl group. The aryl group may further be substituted by other substituent as described above.

The alkyl group as the substituent may be the same as the above-described alkyl group. The alkyl group may further be substituted by other substituent as described above.

The alkenyl group as the substituent may be the same as the above-described alkenyl group. The alkenyl group may further be substituted by other substituent as described above.

The alkynyl group as the substituent may be the same as the above-described alkynyl group. The alkynyl group may further be substituted by other substituent as described above.

Specific examples of the groups represented by (G-1) to (G-7) are shown below, but the present invention is not limited thereto.

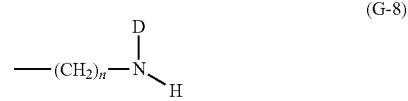
(G-8)

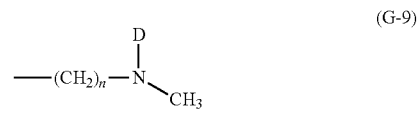
(G-9)

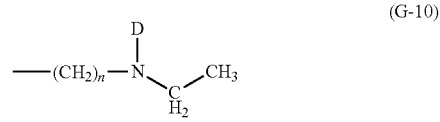
(G-10)

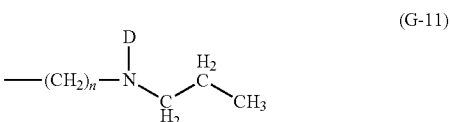
(G-11)

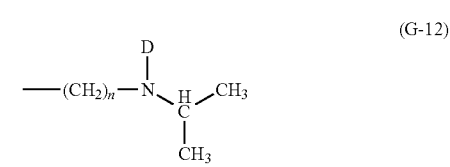
(G-12)

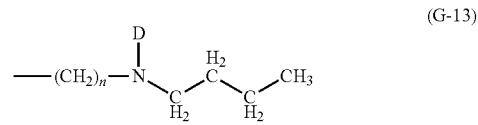
(G-13)

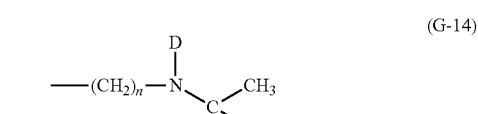
(G-14)

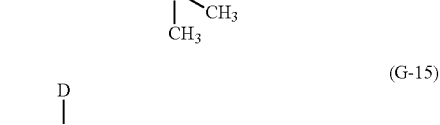
(G-15)

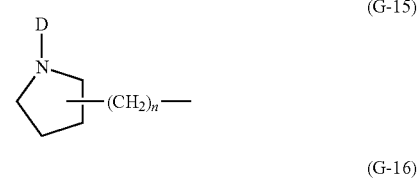
(G-16)

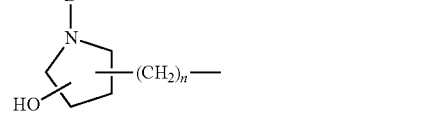
(G-17)

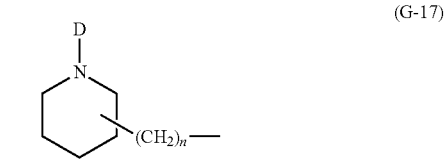
(G-18)

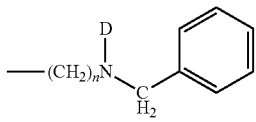

-continued (G-19) 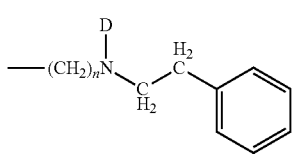

(G-20) 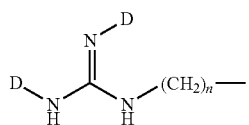

(G-21) 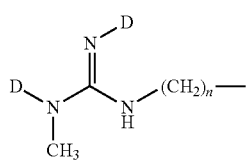

(G-22) 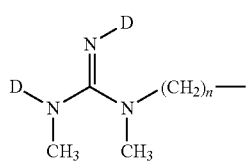

(G-23) 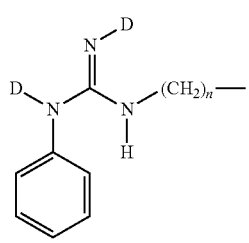

(G-24) 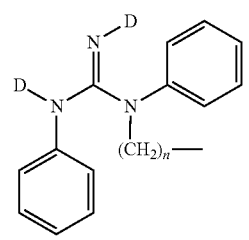

(G-25) 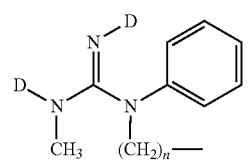

(G-26) 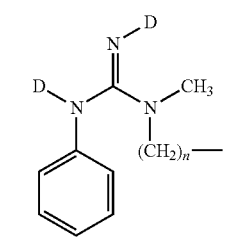

(G-27) 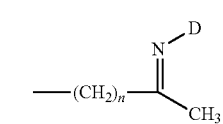

-continued (G-28) 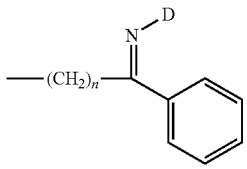

(G-29) 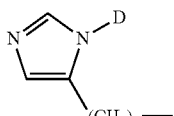

(G-30) 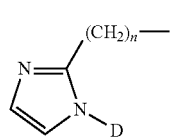

(G-31) 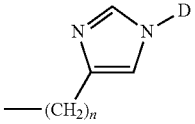

In the above formulae (G-8) to (G-31), n is an integer of from 0 to 20, and D is a tert-butoxycarbonyl group or a 9-fluorenylmethoxycarbonyl group. When there are a plurality of D's in one formula, they may be the same or different from one another.

As a more specific preferred example of the component B of the present invention, a compound represented by the following formula (6) may be mentioned:

  (6)

wherein G is at least one group selected from the formulae (G-1) to (G-7), T is a single bond or a $C_{1-30}$ organic group, the organic group is a hydrocarbon which may have a substituent, a is an integer of from 1 to 8, b is an integer of from 1 to 4, and a relation of a≥b is satisfied.

In the above, the hydrocarbon as T may, for example, be specifically when a+b is 2, an alkylene group, an alkenylene group, an alkynylene group, an arylene group or a structure having these groups combined by a single bond or a bonding group represented by any of the following formulae (E-1) to (E-11), and when a+b is larger than 2, a structure having a required number (a+b-2) of hydrogen atoms removed from such a structure. For T, at least one part in the formula (E-5) is bonded to an arylene group.

  (E-1)

  (E-2)

  (E-3)

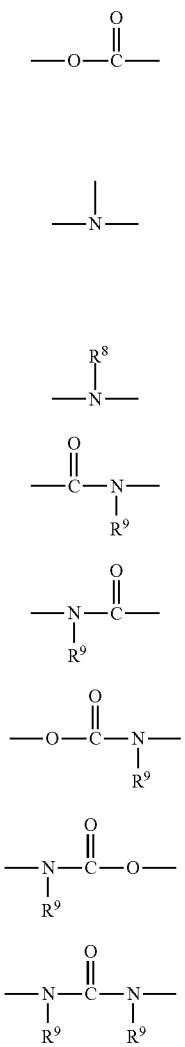

(E-4)
(E-5)
(E-6)
(E-7)
(E-8)
(E-9)
(E-10)
(E-11)

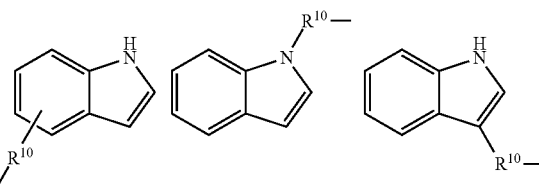

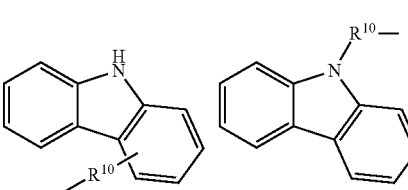

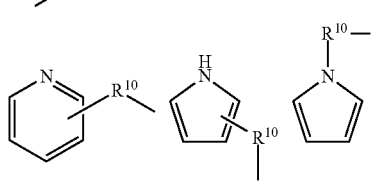

$R^{10}$ in the above formulae is a single bond or a $C_{1-5}$ alkylene group. The $C_{1-5}$ alkylene group may, for example, be a methylene group, a 1,1-ethylene group, a 1,2-ethylene group, a 1,2-propylene group, a 1,3-propylene group, a 1,4-butylene group, a 1,2-butylene group or a 1,2-pentylene group.

As a more preferred example of the compound represented by the above formula (6), compounds represented by the following formulae (7) and (8) may be mentioned:

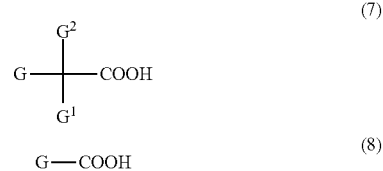

In the above formula (E-6), $R^8$ is a hydrogen atom, a $C_{1-5}$ alkyl group, a tert-butoxycarbonyl group or a 9-fluorenylmethoxycarbonyl group. For T, in a case where $R^8$ is not tert-butoxycarbonyl group nor 9-fluorenylmethoxycarbonyl group, at least one part of (E-6) is bonded to the arylene group. $R^9$ in the above formulae (E-7) to (E-11) is each independently a hydrogen atom or a $C_{1-5}$ alkyl group. The $C_{1-5}$ alkyl group may, for example, be a methyl group, an ethyl group, a propyl group, a butyl group or a t-butyl group.

The alkylene group, alkenylene group, alkynylene group or arylene group constituting T may, for example, be specifically be the above-described groups.

The hydrocarbon as T may have a substituent. The substituent may, for example, be a halogen atom, a hydroxy group, a thiol group, a phosphate group, an ester group, a thioester group, an amido group, a nitro group, an organooxy group, an organosilyl group, an organothio group, an acyl group, an alkyl group, an alkenyl group, an alkynyl group or an aryl group, or the cyclic structure may be formed by the substituent. As specific examples of each substituent, the same groups as described above may be mentioned. Further, the substituent of the hydrocarbon as T may be a nitrogen-containing heterocyclic ring having the following structure.

In the above formulae, G is a group represented by any of the formulae (G-1) to (G-7), and each of $G^1$ and $G^2$ which are independent of each other, is a hydrogen atom or a $C_{1-20}$ organic group, and the organic group is a hydrocarbon which may have a substituent, provided that when neither of $G^1$ and $G^2$ is a group selected from the formulae (G-1) to (G-7), the total number of carbon atoms of $G^1$ and $G^2$ is from 0 to 29.

The hydrocarbon as each of $G^1$ and $G^2$ may be an alkyl group, an alkenyl group, an alkynyl group or an aryl group, which may have a substituent. As specific examples of the alkyl group and the like, the same groups as described above may be mentioned. Further, as specific examples of the substituent, the same substituents as for the hydrocarbon as T in the above formula (6) may be mentioned.

Among the compounds represented by the above formulae (7) and (8), compounds represented by the following formulae (9) and (10) are preferred, since their carboxy group and the basicity-exhibiting moiety are at positions suitable to act simultaneously on the nitrogen atom and the carbonyl carbon concerning the imidization of the polyamic acid ester, whereby the imidization can more efficiently be accelerated.

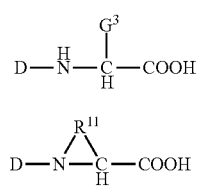
(9)

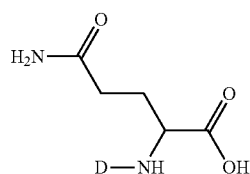
(10)

In the above formulae, D is a tert-butoxycarbonyl group or a 9-fluorenylmethoxycarbonyl group. In the formula (9), $G^3$ is the same as $G^1$ in the formula (7), and in the formula (10), $R^{11}$ is a $C_{1-5}$ alkylene group which may have a substituent.

The $C_{1-5}$ alkylene group may, for example, be a methylene group, a 1,1-ethylene group, a 1,2-ethylene group, a 1,2-propylene group, a 1,3-propylene group, a 1,4-butylene group, a 1,2-butylene group or a 1,2-pentylene group. Further, the substituent may be a halogen atom, a hydroxy group, a thiol group, a phosphate group, an ester group, a thioester group, an amido group, a nitro group, an organooxy group, an organosilyl group, an organothio group, an acyl group, an alkyl group, an alkenyl group, an alkynyl group or an aryl group. As specific examples of each substituent, the same groups as described above may be mentioned.

Specific examples of the compounds represented by the above formulae (9) and (10) are shown below, but the present invention is not limited thereto.

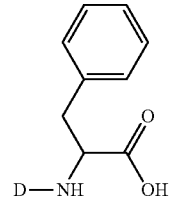
(B-1)

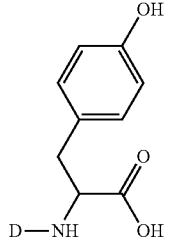
(B-2)

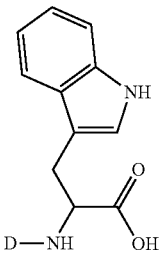
(B-3)

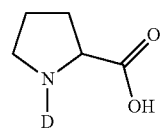
(B-4)

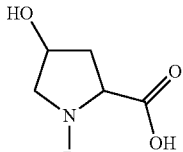
(B-5)

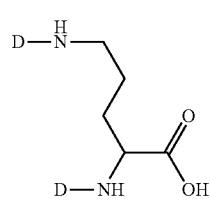
(B-6)

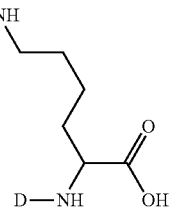
(B-7)

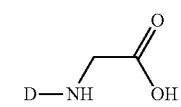
(B-8)

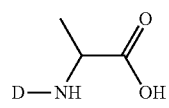
(B-9)

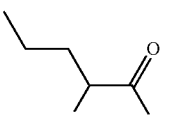
(B-10)

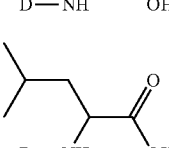
(B-11)

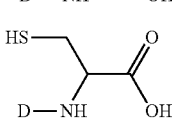
(B-12)

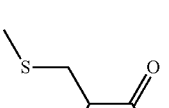
(B-13)

(B-14)

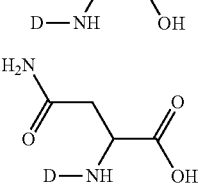
(B-15)

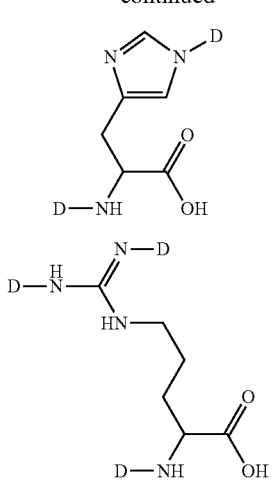

In the above formulae (B-1) to (B-17), D is each independently a tert-butoxycarbonyl group or a 9-fluorenylmethoxycarbonyl group. In the formulae (B-14) to (B-17), there are a plurality of D's in one formula, and they may be the same or different from one another.

The more the structures represented by (ND-1) or (ND-2) defined by the above requirement (c), the higher the basicity after deprotection of the component B of the present invention, and the more the effect of accelerating the imidization of the polyamic acid ester is increased. Accordingly, with a view to further increasing the effect of accelerating the thermal imidization, more preferred is a compound having two or more structures represented by (ND-1) or (ND-2) per one carboxy group. From the same reason, the component B preferably has at least 2, more preferably from 2 to 4 groups of at least one type of a group selected from the formulae (G-1) to (G-7) per one carboxy group. From such a viewpoint, as specific examples of the component (B), (B-14) to (B-17) are preferred, and (B-17) is particularly preferred.

[Solvent]

The organic solvent (C) contained in the polyimide precursor composition of the present invention is not particularly limited so long as it can dissolve the above components A and B to prepare a coating liquid.

The organic solvent as the component (C) is preferably classified into a solvent (hereinafter referred to as a good solvent) in which the solubilities of the components A and B are high and a solvent (hereinafter referred to as a coating property-improving solvent) which is used as mixed with the good solvent to improve the wettability of the coating liquid.

The good solvent may, for example, be specifically N,N-dimethylformamide, N,N-diethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, dimethyl sulfone, hexamethylsulfoxide, γ-butyrolactone, 1,3-dimethyl-imidazolidinone or 3-methoxy-N,N-dimethylpropane amide. They may be used as a mixture of two or more.

The coating property-improving solvent may be a solvent having a lower surface tension than that of the above good solvent. The coating property-improving solvent may, for example, be specifically ethyl cellosolve, ethyl cellosolve acetate, butyl cellosolve, butyl cellosolve acetate, ethyl carbitol, butyl carbitol, ethyl carbitol acetate, ethylene glycol, 1-methoxy-2-propanol, 1-phenoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy) propanol, methyl lactate, ethyl lactate, n-propyl lactate, n-butyl lactate or isoamyl lactate. These solvents may be used in combination of two or more.

The amount of the good solvent in the polyimide precursor composition of the present invention may be the entire amount of the component C but usually the coating property-improving solvent is contained preferably in an amount of from 5 to 60 mass % of the organic component C, more preferably from 10 to 40 mass %. However, if a good coating film can be obtained without use of the coating property-improving solvent, one type of the above good solvent or a mixed solvent having the good solvents combined may be used as the solvent in the polyimide precursor composition of the present invention. Further, even a solvent classified as the coating property-improving solvent may be used as the good solvent if the components A and B have sufficient solubility in the solvent.

[Polyimide Precursor Composition]

The polyimide precursor composition of the present invention comprises the components A, B and C, and it may contain one type or two or more types of each of these components.

The content of the component A is not particularly limited so long as it is soluble in the solvent C in the presence of the component B. The content of the component A is preferably, for example, from 0.1 to 30 mass % of the entire polyimide precursor composition, more preferably from 0.5 to 20 mass %, particularly preferably from 1 to 10 mass %.

The content of the component B is properly selected depending on e.g. the imidization degree of the polyimide film to be obtained, the types of the components A and B, and the baking temperature and the baking time at the time of thermal imidization. That is, the content of the component B is not particularly limited so long as the effect of accelerating the thermal imidization of the component A is obtained. However, in general, the content of the component B is preferably at least 0.01 mol, more preferably at least 0.05 mol, further preferably at least 0.1 mol per 1 mol of the amic acid ester moiety of the following formula (11) (in the formula, R is a monovalent organic group) in the component A. On the other hand, the content of the component B is preferably at most 2 mol, more preferably at most 1 mol, further preferably at most 0.5 mol, per 1 mol of the amic acid ester moiety of the following formula in the component A, with a view to minimizing the adverse effects of the component B itself remaining in the film after baking over various properties of the polyimide film.

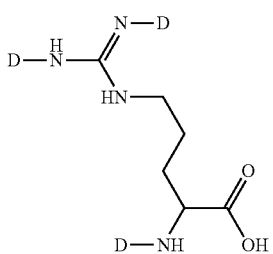

(11)

Further, the content of the component C is preferably from 50 to 99.5 mass %, more preferably from 75 to 99 mass %, particularly preferably from 85 to 98 mass %, in the entire polyimide precursor composition.

The polyimide precursor composition of the present invention may contain a silane coupling agent, other additives and polymer in addition to the above components, as the case requires.

[Silane Coupling Agent]

The polyimide precursor composition of the present invention may contain a silane coupling agent. A preferred silane coupling agent is an organic silicon compound represented by the following structural formula (12):

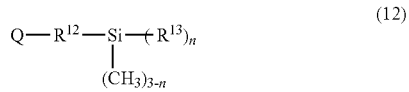

$$Q-R^{12}-Si-(R^{13})_n \quad (12)$$
$$(CH_3)_{3-n}$$

wherein Q is an organic functional group having an amino group, a vinyl group, an epoxy group, a methacrylic group, an acrylic group, a ureido group, a sulfide group, a mercapto group, an isocyanate group, an aldehyde group or a carbamate group, $R^{12}$ is a single bond or a $C_{1-3}$ alkylene group, $R^{13}$ is a hydrolyzable group such as a methoxy group, an ethoxy group, a 2-methoxyethoxy group or an acetoxy group, and n is an integer of from 1 to 3.

Such a silane coupling agent is called, depending on the type of the organic functional group represented by Q, an amine type silane coupling agent, a vinyl type silane coupling agent, an epoxy type silane coupling agent, a methacrylic type silane coupling agent, an acrylic type silane coupling agent, an ureido type silane coupling agent, a sulfide type silane coupling agent, a mercapto type silane coupling agent, an isocyanate type silane coupling agent, an aldehyde type silane coupling agent, a carbamate type silane coupling agent or the like.

With respect to the above silane coupling agent, the moiety represented by $R^{13}$ in the formula (12) is hydrolyzed to form a silanol, and the silanol is reacted with an inorganic material and bonded. On the other hand, the organic functional group represented by Q in the formula (12) is reacted or interacts with an organic material. As a result, the adhesion between the organic material and the inorganic material will be improved.

The simplest method of using the silane coupling agent when a polyimide film is prepared by the coating liquid is a method of adding the silane coupling agent to the coating liquid. However, the silanol groups are known to undergo polycondensation reaction. That is, when the silane coupling agent is hydrolyzed in the coating liquid, the silane coupling agent molecules undergo polycondensation reaction, whereby not only the silane coupling agent which contributes to the adhesion to the substrate is reduced but in some cases, the polymer undergoes crosslinking thereby to reduce the storage stability.

In general, the hydrolysis of an alkoxysilane is accelerated under acidic conditions or under basic conditions, and the subsequent polycondensation reaction of the silanol groups also quickly proceeds. However, it is known that the polycondensation reaction of the silanol groups is suppressed at about pH 4. Accordingly, when a polyamic acid is contained in the coating liquid, due to the action by the carboxy group, even thought the above hydrolysis is accelerated, the subsequent polycondensation of silanol tends to be suppressed. On the other hand, in the case of the polyamic acid ester, the polycondensation of the silanol cannot be suppressed unless an acidic group is imparted to the structure. Accordingly, if the silane coupling agent contained in the coating liquid is hydrolyzed by some reasons, the polycondensation of the silanol cannot be suppressed only by the polyamic acid ester and as a result, the adhesion-improving effect is weakened, or the storage stability is impaired.

For example, when a strongly basic compound is added as the thermal imidization accelerator to the polyamic acid ester coating liquid, the hydrolysis of the silane coupling agent is accelerated by its basicity, and the formed silanol groups undergo the polycondensation reaction. On the other hand, if the basicity is weak, the effect of accelerating the imidization of the polyamic acid ester cannot be expected too much. Further, a neutral compound having a basic group of a thermal imidization accelerator merely protected by a protecting group which leaves by heat, will not accelerate the hydrolysis of the silane coupling agent but cannot suppress the polycondensation of the formed silanol.

On the other hand, with the polyimide precursor composition of the present invention, as the above component B has a carboxy group, it shows acidity until the protecting group D in the component B leaves, whereby the polycondensation of the silanol is suppressed, and the hydrolysis of the silane coupling agent is accelerated as well. Further, even before the protecting group D leaves, the hydrolysis of the silane coupling agent is accelerated to preliminarily form silanol groups, whereby the reaction of the silanol groups with the substrate will quickly proceed when the protecting group D leaves and the entire composition becomes neutral or basic. As a result, with the polyimide precursor composition of the present invention, by addition of a silane coupling agent, not only excellent storage stability of the coating liquid is achieved, but also improvement of the adhesion by the silane coupling agent will more efficiently be achieved. Accordingly, with the polyimide precursor composition of the present invention, a polyimide film excellent in the adhesion can be obtained even with a small amount of the silane coupling agent.

Among the components B in the present invention, one having a pH of from 6 to 8 after the protecting group D leaves can let the hydrolysis reaction of the silane coupling agent and the subsequent polycondensation of the silanol moderately proceed, whereby after the protecting group D leaves, reaction of the silane coupling agent molecules prior to the reaction with the substrate can be suppressed. Accordingly, the component (B) of the present invention which satisfies the above requirements is preferred, whereby the improvement of the adhesion by the silane coupling agent is particularly efficiently achieved. As specific examples of such a component B, the above (B-1) to (B-4), (B-12), (B-16) and the like may be mentioned.

The silane coupling agent to be contained in the polyimide precursor composition of the present invention is preferably a non-amine type silane coupling agent which will not accelerate the imidization of the polyamic acid ester during storage of the coating liquid. Specifically, preferred is a vinyl type silane coupling agent, an epoxy type silane coupling agent, a methacrylic type silane coupling agent, an acrylic type silane coupling agent, a ureido type silane coupling agent, a sulfide type silane coupling agent, a mercapto type silane coupling agent, an isocyanate type silane coupling agent, an aldehyde type silane coupling agent, a carbamate type silane coupling agent or the like and as represented by the above formula (12), preferred is a compound wherein Q is a functional group other than the amino group, specifically, an organic functional group having a vinyl group, an epoxy group, a methacrylic group, an acrylic group, a ureido group, a sulfide group, a mercapto group, an isocyanate group, an aldehyde group, a carbamate group or the like. Particularly preferred is an epoxy type silane coupling agent, which has an excellent effect of improving the adhesion of the polyimide film when added to the polyimide precursor composition of the present invention.

The epoxy type silane coupling agent may, for example, be specifically 3-glycidoxypropyltrimethoxysilane, 3-glycidoxypropyltriethoxysilane, 3-glycidoxypropylmethyldiethoxysilane, 3-glycidoxypropylmethyldimethoxysilane or 2-(3,4-epoxycyclohexyl)ethyltrimethoxysilane.

When the silane coupling agent is added to the polyimide precursor composition of the present invention, the adhesion to the substrate can be more improved by heating the polyimide precursor composition of the present invention having the silane coupling agent added to accelerate the reaction of the organic functional group of the silane coupling agent with the polyamic acid ester. The method of reacting the polyamic acid ester with the silane coupling agent may be a method of adding the silane coupling agent to a solution having the polyamic acid ester dissolved in the above good solvent, followed by stirring at from 20° C. to 80° C., more preferably at from 40° C. to 60° C. for from 1 to 24 hours. The amount of the silane coupling agent is preferably from 0.01 to 5.0 mass %, more preferably from 0.1 to 1.0 mass % to the polyamic acid ester.

The method of incorporating the silane coupling agent in the polyimide precursor composition of the present invention may be a method of using the silane coupling agent as a part of the material monomers when the polyamic acid ester is prepared, in addition to the above method of adding it to the solution of the polyamic acid ester or of adding it, followed by reaction. As described above, the polyamic acid ester may be prepared by using as the starting material monomer a tetracarboxylic dianhydride, an acid chloride, a tetracarboxylic acid dialkyl ester, a diamine or the like. Accordingly, by properly selecting a structure having reactivity with such a starting material monomer as the organic functional group of the silane coupling agent, a polyamic acid ester containing a silane coupling agent can be obtained.

[Other Additives]

The polyimide precursor composition of the present invention may contain various additives other than the above, such as a crosslinking agent and a surfactant.

Further, it may contain a polymer other than the polyamic acid ester. Such a polymer other than the polyamic acid ester may, for example, be when a polyimide film obtainable from the polyimide precursor composition of the present invention is used as a liquid crystal alignment film, a polyamic acid obtainable from a tetracarboxylic dianhydride and a diamine, a polyimide obtainable by cyclodehydration of the polyamic acid, a polyester, a polyamide, a polysiloxane, a polyacetal, a polyacrylate, a poly(meth)acrylate, a cellulose derivative, a polystyrene derivative or a poly(styrene-phenylmaleimide) derivative. Among them, a polyamic acid or a polyimide is preferred, and a polyamic acid is particularly preferred.

[Method for Preparing Polyimide Precursor Composition]

An example of a method for preparing the polyimide precursor composition of the present invention will be described below, but the composition of the present invention is not limited to one obtained by this preparation method.

A powder of the polyamic acid ester as the component A of the present invention is dissolved in the above good solvent to form a solution of the polyamic acid ester. Heating may be conducted when the powder of the polyamic acid ester is dissolved. The heating temperature is preferably from 20° C. to 150° C., particularly preferably from 20° C. to 80° C. Further, when the above coating property-improving solvent is added, it may be added to this solution. When a silane coupling agent is added, it is added preferably before the coating property-improving solvent is added. To the solution thus prepared, the component B of the present invention is added to obtain the polyimide precursor composition of the present invention. When the component B is added, it is preferably added while the temperature of the solution is adjusted to be from 0° C. to 40° C., preferably from 10° C. to 25° C., so as to prevent the protecting group D in the component B from leaving.

[Method for Preparing Polyimide Film]

An example of a method of preparing a polyimide film by using the polyimide precursor composition of the present invention will be described below, but the method of use of the composition of the present invention is not limited thereto.

The polyimide precursor composition of the present invention is applied to a substrate, dried and baked to prepare a polyimide film. When a thin film is to be prepared, the polyimide precursor composition of the present invention is preferably subjected to filtration through a membrane filter or the like before use.

The substrate on which the polyimide film of the present invention is to be formed is not particularly limited and may, for example, be a glass substrate, a silicon nitride substrate, a plastic substrate such as an acrylic substrate or a polycarbonate substrate, a silicon wafer or a substrate having an electrode such as an ITO electrode or an aluminum electrode formed.

The application method may, for example, be a spin coating method, a printing method or an ink jet method.

In the drying and baking steps after the polyimide precursor composition is applied, optional temperature and time can be selected. Usually, the polyimide precursor composition is dried at from 50° C. to 120° C. for from 1 minute to 10 minutes to remove the organic solvent contained and then baked at from 150° C. to 300° C. for from 5 minutes to 120 minutes.

Now, the present invention will be described in further detail with reference to Examples. However, the present invention is by no means restricted thereto.

EXAMPLES

Now, the present invention will be described more specifically with reference to Examples and Comparative Examples, but the present invention is by no means restricted thereto. Methods of the molecular weight measurement and FT-IR measurement conducted in Preparation Examples, Examples and Comparative Examples are shown below.

[Molecular Weight Measurement]

The molecular weight of the polyamic acid ester was measured by a GPC (normal temperature gel permeation chromatography) apparatus to calculate the number average molecular weight (hereinafter sometimes referred to as Mn) and the weight average molecular weight (hereinafter sometimes referred to as Mw) as calculated as polyethylene glycol and polyethylene oxide.

GPC apparatus: manufactured by Shodex (GPC-101)

Column: manufactured by Shodex (KD803 and KD805 in series)

Column temperature: 50° C.

Eluent: N,N-dimethylformamide (as additives, 30 mmol/L of lithium bromide monohydrate (LiBr —$H_2O$), 30 mmol/L of phosphoric acid anhydrous crystals (o-phosphoric acid) and 10 ml/L of tetrahydrofuran (THF))

Flow rate: 1.0 mL/min

Standard sample for preparation of analytical curve: manufactured by TOSOH CORPORATION, TSK, standard polyethylene oxide (weight average molecular weight (Mw): about 900,000, 150,000, 100,000 and 30,000) and polyethylene glycol manufactured by Polymer Laboratories (peak top molecular weight (Mp): about 12,000, 4,000 and 1,000).

Measurement was carried out with respect to two samples of a sample having four types with molecular weights of 900,000, 100,000, 12,000 and 1,000 mixed and a sample having three types with molecular weights of 150,000, 30,000 and 4,000 mixed, separately, so as to avoid overlap of peaks.
[FT-IR Measurement]

Apparatus: NICOLET5700 (manufactured by Thermo ELECTRON), Smart Orbit accessory.

Measurement method: ATR method

Preparation Example 1

Preparation of Polyamic Acid Ester (PAE-1)

The atmosphere in a 300 mL four-necked flask equipped with a stirrer was replaced with nitrogen, 3.00 g (27.74 mmol) of paraphenylenediamine was put, and then 172.8 g of N-methyl-2-pyrrolidone (hereinafter referred to as NMP) and 5.16 g of pyridine were added, followed by stirring for dissolution. Then, while this solution was stirred, 8.08 g (27.19 mmol) of dimethyl 2,4-bis(chlorocarbonyl)cyclobutane-1,3-dicarboxylate was added, followed by reaction under cooling with water for 2 hours.

The obtained reaction solution was put in 909 g of water, the precipitated white crystals were collected by filtration and washed with 909 g of water once, 909 g of methanol once and 227 g of methanol three times and then dried to obtain 8.16 g of a white powder of polyamic acid ester (PAE-1). The molecular weights of the polyamic acid ester were Mn=15,689 and Mw=42,335. Since the molecular weight of each repeating unit constituting PAE-1 is 332.31, the amount of the amic acid ester groups contained in 1 g of PAE-1 is 6.02 mmol.

Preparation Example 2

Preparation of Polyamic Acid Ester (PAE-2)

The atmosphere in a 300 mL four-necked flask equipped with a stirrer was replaced with nitrogen, 3.00 g (27.74 mmol) of paraphenylenediamine was put, and then 185.3 g of NMP and 508 g (64.25 mmol) of pyridine were added, followed by stirring for dissolution. Then, while this solution was stirred, 8.70 g (26.77 mmol) of dimethyl 1,3-bis(chlorocarbonyl)-1,3-dimethylcyclobutane-2,4-dicarboxylate was added, followed by reaction under cooling with water for 2 hours.

The obtained reaction solution was put in 975 g of water, the precipitated white crystals were collected by filtration and washed with 975 g of water once, 975 g of methanol once and 244 g of methanol three times and then dried to obtain 8.52 g of a white powder of polyamic acid ester (PAE-2). The molecular weights of the polyamic acid ester were Mn=16,421 and Mw=35,361. Since the molecular weight of each repeating unit constituting PAE-2 is 360.36, the amount of the amic acid ester groups contained in 1 g of PAE-2 is 5.55 mmol.

In the above reaction, dimethyl 1,3-bis(chlorocarbonyl)-1,3-dimethylcyclobutane-2,4-dicarboxylate prepared as follows, followed by recrystallization repeatedly for purification, was used. 1,3-dimethyl-1,2,3,4-cyclobutanetetracarboxylic dianhydride and methanol were reacted at 65° C., and a mixture of dimethyl tetracarboxylate was recovered, followed by recrystallization with ethyl acetate to obtain 1,3-bis(methoxycarbonyl)-1,3-dimethylcyclobutane-2,4-dicarboxylic acid as crystals. The crystals were reacted with thionyl chloride in n-heptane in the presence of pyridine at 75° C. to obtain dimethyl 1,3-bis(chlorocarbonyl)-1,3-dimethylcyclobutane-2,4-dicarboxylate.

Preparation Example 3

Preparation of Polyamic Acid Ester (PAE-3)

The atmosphere in a 300 mL four-necked flask equipped with a stirrer was replaced with nitrogen, 4.00 g (19.98 mmol) of 4,4'-oxydianiline was put, and then 157.7 g of NMP and 3.64 g of pyridine were added, followed by stirring for dissolution. Then, while this solution was stirred, 5.70 g (19.18 mmol) of dimethyl 2,4-bis(chlorocarbonyl)cyclobutane-1,3-dicarboxylate was added, followed by reaction under cooling with water for 2 hours.

The obtained reaction solution was put in 830 g of water, the precipitated white crystals were collected by filtration and washed with 830 g of water once, 830 g of ethanol once and 207 g of ethanol three times and then dried to obtain 7.36 g of a white powder of polyamic acid ester (PAE-3). The molecular weights of the polyamic acid ester were Mn=16,619 and Mw=37,951. Since the molecular weight of each repeating unit constituting PAE-3 is 424.40, the amount of the amic acid ester groups contained in 1 g of PAE-3 is 4.71 mmol.

Example 1

3.40 g of the powder of PAE-1 obtained in Preparation Example 1 was put in an Erlenmeyer flask, 30.7 g of NMP was added, followed by stirring at room temperature for 24 hours for dissolution. To the solution, 0.30 g of NMP and 13.60 g of butyl cellosolve (hereinafter referred to as BCS) were added, followed by stirring for 30 minutes to prepare a polyamic acid ester solution (A1).

To 6.04 g of the above polyamic acid ester solution (A1), 0.0895 g (0.1 molar equivalent per 1 mol of the amic acid ester groups) of N-α-(9-fluorenylmethoxycarbonyl)-N-t-butoxycarbonyl-L-histidine (hereinafter referred to as Fmoc-His) as the component B was added, followed by stirring at room temperature for 30 minutes to completely dissolve Fmoc-His thereby to obtain a polyimide precursor composition (A1-b1).

Example 2

A polyimide precursor composition (A1-b2) was obtained in the same manner as in Example 1 except that as the component B, N-α, N-ω1, N-ω2-tri-t-butoxycarbonyl-L-arginine (hereinafter referred to as Boc-Arg) was used in an amount of 0.1 molar equivalent per 1 mol of the amic acid ester groups.

Example 3

A polyimide precursor composition (A1-b3) was obtained in the same manner as in Example 1 except that as the component B, N-α, im-di-t-butoxycarbonyl-L-histidine (hereinafter referred to as Boc-His) was used in an amount of 0.1 molar equivalent per 1 mol of the amic acid ester groups.

Example 4

A polyimide precursor composition (A1-b4) was obtained in the same manner as in Example 1 except that as the component B, N-α-(9-fluorenylmethoxycarbonyl)-N-ε-t-butoxycarbonyl-L-lysine (hereinafter referred to as Fmoc-Lys) was used in an amount of 0.1 molar equivalent per 1 mol of the amic acid ester groups.

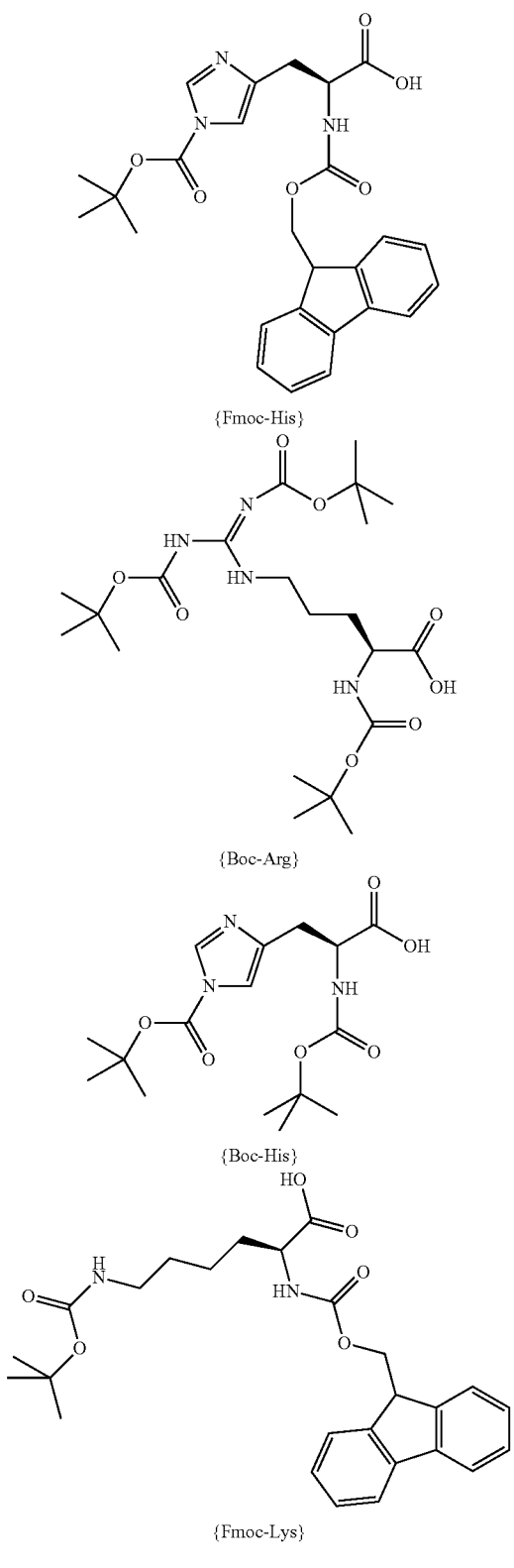

{Fmoc-His}

{Boc-Arg}

{Boc-His}

{Fmoc-Lys}

Example 5

The polyimide precursor composition (A1-b1) obtained in Example 1 was filtrated through a membrane filter of 1.0 applied to a glass substrate by spin coating, dried on a hot plate at a temperature of 80° C. for 5 minutes and baked at 230° C. for 10 minutes to obtain a polyimide film having a film thickness of 100 nm. This polyimide film was scooped and subjected to FT-IR spectrum measurement by the ATR method to calculate the imidization degree, which is shown in Table 1.

Example 6

A polyimide film was prepared in the same manner as in Example 5 except that the baking time was 20 minutes, and the FT-IR spectrum was measured and the imidization degree was calculated. The results are shown in Table 1.

Examples 7 to 12

A polyimide film was prepared in the same manner as in Example 5 or 6 using each of the polyimide precursor compositions (A1-b2) to (A1-b4) obtained in Examples 2 to 4, and the FT-IR spectrum was measured and the imidization degree was calculated. The results are shown in Table 1.

Comparative Examples 1 and 2

A polyimide film was prepared in the same manner as in Example 5 or 6 using the polyamic acid ester solution (A1) prepared in Example 1, and the FT-IR spectrum was measured and the imidization degree was calculated. The results are shown in Table 1.

Comparative Examples 3 and 4

A polyimide precursor composition (A1-c1) was obtained in the same manner as in Example 1 except that instead of the component B, N-α, im-di-t-butoxycarbonyl-L-histidine methyl ester (hereinafter referred to as Boc-His-OMe) was used in an amount of 0.1 molar equivalent per 1 mol of the amic acid ester groups. A polyimide film was prepared in the same manner as in Example 5 or 6 using the polyimide precursor composition (A1-c1), and the FT-IR spectrum was measured and the imidization degree was calculated. The results are shown in Table 1.

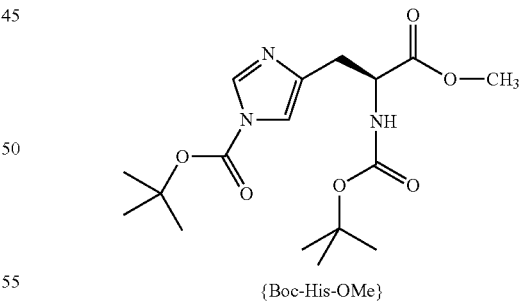

{Boc-His-OMe}

TABLE 1

| | Composition | Imidization accelerator (amount) | Baking time | Imidization degree |
|---|---|---|---|---|
| Ex. 5 | A1-b1 | Fmoc-His (0.1) | 10 minutes | 60% |
| Ex. 6 | A1-b1 | Fmoc-His (0.1) | 20 minutes | 63% |
| Ex. 7 | A1-b2 | Boc-Arg (0.1) | 10 minutes | 66% |
| Ex. 8 | A1-b2 | Boc-Arg (0.1) | 20 minutes | 67% |

TABLE 1-continued

| | Composition | Imidization accelerator (amount) | Baking time | Imidization degree |
|---|---|---|---|---|
| Ex. 9 | A1-b3 | Boc-His (0.1) | 10 minutes | 62% |
| Ex. 10 | A1-b3 | Boc-His (0.1) | 20 minutes | 67% |
| Ex. 11 | A1-b4 | Fmoc-Lys (0.1) | 10 minutes | 42% |
| Ex. 12 | A1-b4 | Fmoc-Lys (0.1) | 20 minutes | 42% |
| Comp. Ex. 1 | A1 | — | 10 minutes | 13% |
| Comp. Ex. 2 | A1 | — | 20 minutes | 16% |
| Comp. Ex. 3 | A1-c1 | Boc-His-OMe (0.1) | 10 minutes | 14% |
| Comp. Ex. 4 | A1-c1 | Boc-His-OMe (0.1 | 20 minutes | 17% |

Example 13

5.00 g of the powder of PAE-2 obtained in Preparation Example 2 was put in Erlenmeyer flask, and 45.00 g of dimethylformamide was added, followed by stirring at room temperature for 24 hours for dissolution. To the solution, 16.67 g of γ-butyrolactone and 16.67 g of BCS were added, followed by stirring for 30 minutes to prepare a polyamic acid solution (A2).

To 6.09 g of the above polyamic acid ester solution (A2), 0.102 g (0.1 molar equivalent per 1 mol of the amic acid ester groups) of Fmoc-His as the component B was added, followed by stirring at room temperature for 30 minutes to completely dissolve Fmoc-His to obtain a polyimide precursor composition (A2-b1).

Example 14

A polyimide precursor composition (A2-b2) was obtained in the same manner as in Example 13 except that as the component B, Boc-Arg was used in an amount of 0.1 molar equivalent per 1 mol of the amic acid ester groups.

Example 15

A polyimide precursor composition (A2-b3) was obtained in the same manner as in Example 13 except that as the component B, Boc-His was used in an amount of 0.1 molar equivalent per 1 mol of the amic acid ester groups.

Example 16

A polyimide precursor composition (A2-b4) was obtained in the same manner as in Example 13 except that as the component B, Fmoc-Lys was used in an amount of 0.1 molar equivalent per 1 mol of the amic acid ester groups.

Examples 17 to 24

A polyimide film was prepared in the same manner as in Example 5 or 6 using each of the polyimide precursor compositions (A2-b1) to (A2-b4) obtained in Examples 13 to 16, and the FT-IR spectrum was measured and the imidization degree was calculated. The results are shown in Table 2.

Comparative Examples 5 and 6

A polyimide film was prepared in the same manner as in Example 5 or 6 using the polyamic acid ester solution (A2) prepared in Example 13, and the FT-IR spectrum was measured and the imidization degree was calculated. The results are shown in Table 2.

Comparative Examples 7 and 8

A polyimide precursor composition (A2-c1) was obtained in the same manner as in Example 13 except that instead of the component B, Boc-His-OMe was used in an amount of 0.1 molar equivalent per 1 mol of the amic acid ester groups. A polyimide film was prepared in the same manner as in Example 5 or 6 using the polyimide precursor composition (A2-c1), and the FT-IR spectrum was measured and the imidization degree was calculated. The results are shown in Table 2.

Comparative Examples 9 and 10

Polyimide precursor compositions (A2-c2) and (A2-c3) were obtained in the same manner as in Example 13 except that as the component B, N-(t-butoxycarbonyl)-2,6-dimethylpyridine (hereinafter referred to as Boc-P) was used in an amount of 1 molar equivalent and 2 molar equivalents, respectively, per 1 mol of the amic acid ester groups. Using these polyimide precursor compositions, polyimide films were prepared in the same manner as in Example 6, and the FT-IR spectrum was measured and the imidization degree was calculated. The results are shown in Table 2.

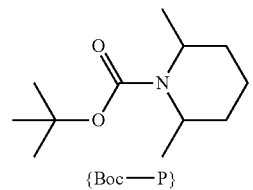

{Boc—P}

Comparative Example 11

A polyimide precursor composition (A2-c4) was obtained in the same manner as in Example 13 except that instead of the component B, p-hydroxyphenylacetic acid (hereinafter referred to as p-HPA) was used in an amount of 0.1 molar equivalent per 1 mol of the amic acid ester groups. A polyimide film was prepared in the same manner as in Example 6 using the polyimide precursor composition, and the FT-IR spectrum was measured and the imidization degree was calculated. The results are shown in Table 2.

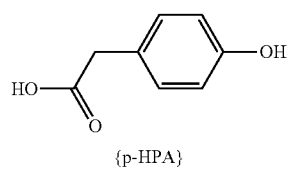 [SMILES: O=C(O)Cc1ccc(O)cc1]

{p-HPA}

TABLE 2

| | Composition | Imidization accelerator (amount) | Baking time | Imidization degree |
|---|---|---|---|---|
| Ex. 17 | A2-b1 | Fmoc-His (0.1) | 10 minutes | 79% |
| Ex. 18 | A2-b1 | Fmoc-His (0.1) | 20 minutes | 78% |
| Ex. 19 | A2-b2 | Boc-Arg (0.1) | 10 minutes | 94% |
| Ex. 20 | A2-b2 | Boc-Arg (0.1) | 20 minutes | 93% |
| Ex. 21 | A2-b3 | Boc-His (0.1) | 10 minutes | 76% |
| Ex. 22 | A2-b3 | Boc-His (0.1) | 20 minutes | 81% |
| Ex. 23 | A2-b4 | Fmoc-Lys (0.1) | 10 minutes | 80% |
| Ex. 24 | A2-b4 | Fmoc-Lys (0.1) | 20 minutes | 85% |
| Comp. Ex. 5 | A2 | — | 10 minutes | 31% |
| Comp. Ex. 6 | A2 | — | 20 minutes | 36% |
| Comp. Ex. 7 | A2-c1 | Boc-His-OMe (0.1) | 10 minutes | 46% |
| Comp. Ex. 8 | A2-c1 | Boc-His-OMe (0.1) | 20 minutes | 46% |
| Comp. Ex. 9 | A2-c2 | Boc-P (1) | 20 minutes | 46% |
| Comp. Ex. 10 | A2-c3 | Boc-P (2) | 20 minutes | 47% |
| Comp. Ex. 11 | A2-c4 | p-HPA (1) | 20 minutes | 58% |

Example 25

4.03 g of the powder of PAE-3 obtained in Preparation Example 3 was put in an Erlenmeyer flask, and 39.91 g of MNP was added, followed by stirring at room temperature for 24 hours for dissolution. To this solution, 4.04 g of a 0.2 mass % NMP solution of 3-glycidoxypropylmethyldiethoxysilane (hereinafter referred to as GPS) as a silane coupling agent was added, followed by stirring under heating at 50° C. for 24 hours. To the obtained solution, 5.69 g of NMP and 13.41 g of BCS were added, followed by stirring for 30 minutes to prepare a polyamic acid ester solution (A3S).

To 8.32 g of the above polyamic acid ester solution (A3S), 0.578 g (0.5 molar equivalent per 1 mol of the amic acid ester groups) of Fmoc-His as the component B was added, followed by stirring at room temperature for 30 minutes to completely dissolve Fmos-His to obtain a polyimide precursor composition (A3S-b1).

Example 26

A polyimide precursor composition (A3S-b2) was obtained in the same manner as in Example 25 except that as the component B, Boc-Arg was used in an amount of 0.5 molar equivalent per 1 mol of the amic acid ester groups.

Example 27

A polyimide precursor composition (AS3-b3) was obtained in the same manner as in Example 25 except that as the component B, Boc-His was used in an amount of 0.5 molar equivalent per 1 mol of the amic acid ester groups.

Example 28

A polyimide precursor composition (AS3-b4) was obtained in the same manner as in Example 25 except that as the component B, Fmoc-Lys was used in an amount of 0.5 molar equivalent per 1 mol of the amic acid ester groups.

Example 29

A polyimide precursor composition (A3S-b5) was obtained in the same manner as in Example 25 except that as the component B, N-t-butoxycarbonyl-glycine (hereinafter referred to as Boc-Gly) was used in an amount of 0.5 molar equivalent per 1 mol of the amic acid ester groups.

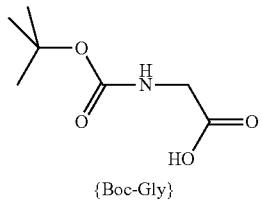

{Boc-Gly}

Examples 30 to 34

A polyimide film was prepared in the same manner as in Example 5 except that each of the polyimide precursor compositions (A3S-b1) to (A3S-b5) obtained in Examples 25 to 29 were used and that the baking time was 30 minutes, and the FT-IR spectrum was measured and the imidization degree was calculated. The results are shown in Table 3.

Comparative Example 12

A polyimide film was prepared in the same manner as in Example 5 except that the polyamic acid ester solution (A3S) obtained in Example 25 was used and that the baking time was 30 minutes, and the FT-IR spectrum was measured and the imidization degree was calculated. The results are shown in Table 2.

Comparative Example 13

A polyimide precursor composition (A3S-c1) was obtained in the same manner as in Example 25 except that instead of the component B, 4-hydroxypyridine (hereinafter referred to as 4-HP) was used in an amount of 0.5 molar equivalent per 1 mol of the amic acid ester groups. A polyimide film was prepared in the same manner as in Example 5 except that the polyimide precursor composition was used and that the baking time was 30 minutes, and the FT-IR spectrum was measured and the imidization degree was calculated. The results are shown in Table 2.

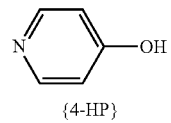

{4-HP}

Comparative Example 14

A polyimide precursor composition (A3S-c2) was obtained in the same manner as in Example 25 except that instead of the component B, N-acetylglycine (hereinafter referred to as A-Gly) was used in an amount of 0.5 molar equivalent per 1 mol of the amic acid ester groups. A polyimide film was prepared in the same manner as in Example 5 except that the polyimide precursor composition was used and that the baking time was 30 minutes, and the FT-IR spectrum was measured and the imidization degree was calculated. The results are shown in Table 2.

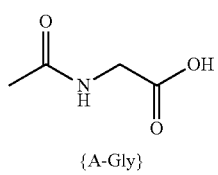

{A-Gly}

Comparative Example 15

A polyimide precursor composition (A3S-c3) was obtained in the same manner as in Example 25 except that instead of the component B, N-phenylglycine (hereinafter referred to as P-Gly) was used in an amount of 0.5 molar equivalent per 1 mol of the amic acid ester groups. A polyimide film was prepared in the same manner as in Example 5 except that the polyimide precursor composition was used and that the baking time was 30 minutes, and the FT-IR spectrum was measured and the imidization degree was calculated. The results are shown in Table 2.

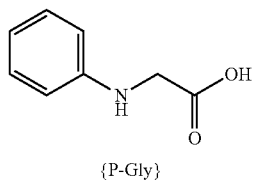 [SMILES: O=C(O)CNc1ccccc1]

{P-Gly}

Comparative Example 16

The same operation as in Example 25 was carried out except that instead of the component B, L-glycine was used in an amount of 0.5 molar equivalent per 1 mol of the amic acid ester groups to try to prepare a polyimide precursor composition, however, L-glycine was not completely dissolved, and no uniform solution could be obtained.

Comparative Example 17

The same operation as in Example 25 was carried out except that instead of the component B, L-arginine was used in an amount of 0.5 molar equivalent per 1 mol of the amic acid ester groups to try to prepare a polyimide precursor composition, however, L-arginine was not completely dissolved, and no uniform solution could be obtained.

Comparative Example 18

The same operation as in Example 25 was carried out except that instead of the component B, L-hystidine was used in an amount of 0.5 molar equivalent per 1 mol of the amic acid ester groups to try to prepare a polyimide precursor composition, however, L-hystidine was not completely dissolved, and no uniform solution could be obtained.

Comparative Example 19

The same operation as in Example 25 was carried out except that instead of the component B, L-lysine was used in an amount of 0.5 molar equivalent per 1 mol of the amic acid ester groups to try to prepare a polyimide precursor composition, however, L-lysine was not completely dissolved, and no uniform solution could be obtained.

TABLE 3

| | Composition | Imidization accelerator (amount) | Baking time | Imidization degree |
|---|---|---|---|---|
| Ex. 30 | A3S-b1 | Fmoc-His (0.5) | 30 minutes | 91% |
| Ex. 31 | A3S-b2 | Boc-Arg (0.5) | 30 minutes | 76% |
| Ex. 32 | A3S-b3 | Boc-His (0.5) | 30 minutes | 81% |
| Ex. 33 | A3S-b4 | Fmoc-Lys (0.5) | 30 minutes | 70% |
| Ex. 34 | A3S-b5 | Boc-Gly (0.5) | 30 minutes | 59% |
| Comp. Ex. 12 | A3S | — | 30 minutes | 31% |
| Comp. Ex. 13 | A3S-c1 | 4-HP (0.5) | 30 minutes | 32% |
| Comp. Ex. 14 | A3S-c2 | A-Gly (0.5) | 30 minutes | 45% |
| Comp. Ex. 15 | A3S-c3 | P-Gly (0.5) | 30 minutes | 44% |

[Evaluation of Adhesion by Cross-Cut Test]

Using as coating liquids for preparation of a polyimide film, the polyimide precursor compositions (A3S-b1) to (A3S-b5) obtained in Examples 25 to 29, the polyamic acid ester solution (A3S) prepared in Example 25, the polyimide precursor compositions (A3S-c1) to (A3S-c3) prepared in Comparative Examples 13 to 15, and a polyamic acid ester solution (A3) comprising only PAE-3, NMP and BSC, the adhesion of a polyimide film obtainable from each coating liquid to an inorganic substrate was evaluated as follows.

A coating liquid is filtrated through a membrane filter of 1.0 μm and applied on a silicon nitride substrate by spin coating, dried on a hot plate at a temperature of 80° C. for 5 minutes and then baked at 230° C. for 20 minutes to prepare a polyimide film having a film thickness of 100 nm. The polyimide film after baking is cooled to room temperature, and a cross-cut test is carried out. Further, a polyimide film prepared on an silicon nitride substrate in the same manner is left at stand (high temperature high humidity test) at a temperature of 70° C. under a humidity of 80% for 24 hours, and then a cross-cut test is carried out.

[Cross-Cut Test]

In accordance with JIS K5600, a cut was made in the polyimide film by a cutter knife with a distance of 2 mm to prepare 100 squares, and a cellophane tape was contact-bonded to the polyimide film and instantaneously peeled to examine the state of peeling of the polyimide film from the silicon nitride substrate. A case where no polyimide film in the 100 squares is peeled at all is represented as 100/100, and in a case where the polyimide film in all the squares is peeled is represented as 0/100.

The results of the cross-cut test are shown in Table 4.

TABLE 4

| Coating liquid | Silane coupling agent | Imidization accelerator (amount) | Adhesion after baking | Adhesion after high temperature high humidity test |
|---|---|---|---|---|
| A3S-b1 | GPS | Fmoc-His (0.5) | 100/100 | 100/100 |
| A3S-b2 | GPS | Boc-Arg (0.5) | 100/100 | 0/100 |
| A3S-b3 | GPS | Boc-His (0.5) | 100/100 | 100/100 |
| A3S-b4 | GPS | Fmoc-Lys (0.5) | 100/100 | 0/100 |
| A3S-b5 | GPS | Boc-Gly (0.5) | 100/100 | 97/100 |
| A3S | GPS | — | 100/100 | 0/100 |
| A3S-c1 | GPS | 4-HP (0.5) | 80/100 | 0/100 |
| A3 | — | — | 0/100 | 0/100 |

TABLE 4-continued

| Coating liquid | Silane coupling agent | Imidization accelerator (amount) | Adhesion after baking | Adhesion after high temperature high humidity test |
|---|---|---|---|---|
| A3S-c2 | GPS | A-Gly (0.5) | 96/100 | 0/100 |
| A3S-c3 | GPS | P-Gly (0.5) | 86/100 | 0/100 |

From the above results, the component B contained in the polyimide precursor composition of the present invention was confirmed not to inhibit the effect of improving the adhesion by the silane coupling agent. Further, it was confirmed that the improvement of the adhesion by the silane coupling agent was more efficiently achieved in the presence of the component B such as Fmoc-His, Boc-His or Boc-Gly.

INDUSTRIAL APPLICABILITY

The polyimide film obtainable from the polyimide precursor composition of the present invention is widely used in an electronic material field as an insulating film, a protective film, a liquid crystal alignment film, etc., and as an aerospace material, etc.

The entire disclosure of Japanese Patent Application No. 2009-089871 filed on Apr. 2, 2009 including specification, claims and summary is incorporated herein by reference in its entirety.

The invention claimed is:

1. A polyimide precursor composition, comprising:
   (A) a polyamic acid ester;
   (B) a thermal imidization accelerator; and
   (C) an organic solvent that can dissolve the polyamic acid ester (A) and the thermal imidization accelerator (B),
   wherein:
   the thermal imidization accelerator is a compound comprising a carboxylic acid group and a structure of formula (N-1) or (N-2):

(N-1)

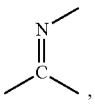
(N-2)

such that at least one structure of formula (N-1) or (N-2) is a structure of formula (ND-1) or (ND-2):

(ND-1)

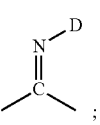
(ND-2)

D represents a protecting group that is deprotected by heating to a temperature of at most 300° C.;

at least one part of each structure of formula (N-1) is bonded to an aromatic ring or a carbonyl group or is a part of a guanidine framework;

the nitrogen atom of each structure of formula (N-2) is bonded to a carbon atom constituting an unsaturated bond;

when the structure of formula (N-1) is a part of the guanidine framework, at least one of the two (N-1) structures contained in the guanidine framework is bonded to an aromatic ring or a carbonyl group;

the structure of formula (ND-1), in the two bonds not forming a bond with the protecting group D, is not directly bonded to an aromatic ring or a carbonyl group; and the thermal imidization accelerator (B) comprises at least one of the structure of formula (ND-1) or (ND-2) per each one of the carboxylic acid group.

2. The composition of claim 1, wherein:

the protecting group (D) is an ester group of formula (5):

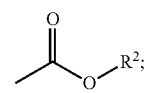
(5)

and $R^2$ is a $C_{1-22}$ hydrocarbon.

3. The composition of claim 2, wherein the ester group of formula (5) is a tert-butoxycarbonyl group or a 9-fluorenylmethoxycarbonyl group.

4. The composition of claim 1, wherein:

the compound (B) comprises at least one moiety having a formula of (G-1) to (G-7) per each of the carboxylic acid group:

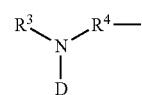
(G-1)

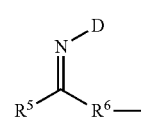
(G-2)

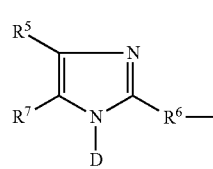
(G-3)

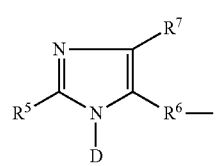
(G-4)

-continued

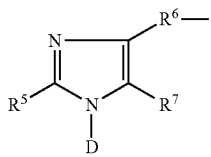 (G-5)

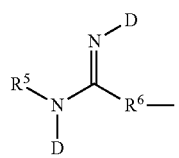 (G-6)

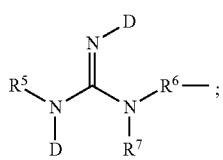 (G-7)

D is the protecting group, provided that when there are a plurality of D groups, each D is independent from each other;

$R^3$ is a hydrogen atom or an optionally substituted $C_{1-30}$ alkyl group;

$R^4$ is a single bond or an optionally substituted $C_{1-30}$ organic group selected from the group consisting of an alkylene, an alkenylene, an alkynylene, and mixtures thereof, provided that when $R^4$ is a single bond, (G-1) is not directly bonded to an aromatic ring or a carbonyl group;

$R^5$ and $R^7$ are each independently a hydrogen atom or an optionally substituted $C_{1-30}$ organic group selected from the group consisting of an alkyl, an alkenyl, an alkynyl, and an aryl;

$R^6$ is a single bond or an optionally substituted $C_{1-30}$ organic group selected from the group consisting of an alkylene, an alkenylene, an alkynylene, an arylene, and mixtures thereof; and $R^3$ to $R^7$ may be mutually bonded to form a monocyclic ring or a polycyclic ring.

5. The composition of claim 4, wherein the compound (B) has formula (6):

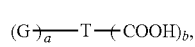 (6)

wherein

G is the at least one moiety having a formula of (G-1) to (G-7),

T is a single bond or an optionally substituted $C_{1-30}$ hydrocarbon, a is an integer of from 1 to 8, b is an integer of from 1 to 4, and a>b.

6. The composition of claim 5, wherein the compound (B) has a structure of formula (7) or (8):

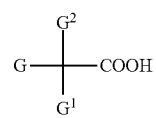 (7)

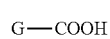 (8)

wherein

G is a moiety having a formula of (G-1) to (G-7), $G^1$ and $G^2$ are each independently a hydrogen atom, a moiety having a formula of (G-1) to (G-7), or an optionally substituted $C_{1-20}$ hydrocarbon, provided that when neither of $G^1$ and $G^2$ is a moiety having a formula of (G-1) to (G-7), a total number of carbon atoms of $G^1$ and $G^2$ is from 0 to 29.

7. The composition of claim 6, wherein:

at least one of the thermal imidization accelerator (B) has a formula of (B-1) to (B-17):

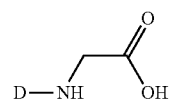 (B-1)

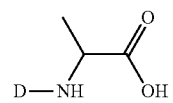 (B-2)

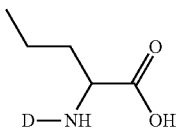 (B-3)

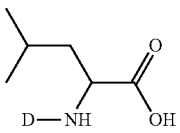 (B-4)

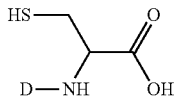 (B-5)

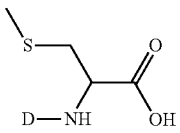 (B-6)

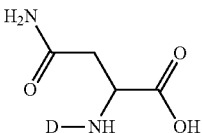 (B-7)

and
each D is independently a t-butoxycarbonyl group or a 9-fluorenylmethoxycarbonyl group.

8. The composition of claim 1, wherein:
the compound (A) comprises an amic acid moiety of formula (II):

$$\text{(II)}$$

R is a monovalent organic group;
the composition has a content of compound (A) of from 0.1 to 30 mass % and a content of organic solvent (C) of from 50 to 99.5 mass %, each based on a total mass of the composition, and a content of the compound (B) of from 0.01 to 2 mol per 1 mol of the amic acid moiety of the compound (A).

9. The composition of claim 1, further comprising:
a silane coupling agent.

10. The composition of claim 9, wherein:
the silane coupling agent is an organic silicon compound of formula (12):

$$Q\text{—}R^{12}\text{—}\underset{(CH_3)_{3-n}}{Si}\text{—}(R^{13})_n; \quad (12)$$

Q is an organic group comprising a functional group selected from the group consisting of an amino group, a vinyl group, an epoxy group, a methacrylic group, an acrylic group, a ureido group, a sulfide group, a mercapto group, an isocyanate group, an aldehyde group, and a carbamate group;
$R^{12}$ is a single bond or a $C_{1-3}$ alkylene group;
$R^{13}$ is a hydrolyzable group; and
n is an integer of from 1 to 3.

11. A polyimide film obtained by a process comprising:
contacting a surface with the polyimide precursor composition of claim 1, to obtain a film layer; and
heating the film layer, to obtain the polyimide film.

12. The polyimide film of claim 11, wherein the film is a liquid crystal alignment film.

13. The composition of claim 2, wherein the ester group of formula (5) is a tert-butoxycarbonyl group.

14. The composition of claim 2, wherein the ester group of formula (5) is a 9-fluorenylmethoxycarbonyl group.

15. The composition of claim 7, wherein the compound (B) has the formula (B-14).

16. The composition of claim 7, wherein the compound (B) has the formula (B-15).

17. The composition of claim 7, wherein the compound (B) has the formula (B-16).

18. The composition of claim 7, wherein the compound (B) has the formula (B-17).

19. The composition of claim 10, wherein $R^{13}$ is selected from the group consisting of a methoxy group, an ethoxy group, a 2-methoxyethoxy group, and an acetoxy group.

20. The polyimide film of claim 12, wherein the film is suitable for use in a liquid crystal display device.

\* \* \* \* \*